(12) United States Patent
Matsushita et al.

(10) Patent No.: US 7,620,247 B2
(45) Date of Patent: Nov. 17, 2009

(54) IMAGE PROCESSING APPARATUS, IMAGE PROCESSING METHOD, PROGRAM, AND STORAGE MEDIUM

(75) Inventors: Masahiro Matsushita, Yokohama (JP); Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 11/280,234

(22) Filed: Nov. 17, 2005

(65) Prior Publication Data

US 2006/0110073 A1 May 25, 2006

(30) Foreign Application Priority Data

Nov. 22, 2004 (JP) .............................. 2004-337947

(51) Int. Cl.
*G06K 9/64* (2006.01)
(52) U.S. Cl. ...................................................... 382/217
(58) Field of Classification Search ........................ None
See application file for complete search history.

(56) References Cited

U.S. PATENT DOCUMENTS

| | | | | |
|---|---|---|---|---|
| 5,067,166 | A * | 11/1991 | Ito .............................. | 382/215 |
| 6,400,853 | B1 * | 6/2002 | Shiiyama ..................... | 382/305 |
| 6,584,223 | B1 | 6/2003 | Shiiyama ..................... | 382/173 |
| 6,977,963 | B1 * | 12/2005 | Shiiyama ............... | 375/240.24 |
| 7,075,683 | B1 | 7/2006 | Shiiyama ..................... | 358/452 |
| 2004/0243602 | A1 | 12/2004 | Shiiyama .................... | 707/100 |
| 2006/0120627 | A1 | 6/2006 | Shiiyama ..................... | 382/305 |
| 2006/0164702 | A1 | 7/2006 | Shiiyama ..................... | 358/537 |
| 2006/0274081 | A1 | 12/2006 | Matsushita .................. | 345/589 |

FOREIGN PATENT DOCUMENTS

| | | |
|---|---|---|
| JP | 8-249349 | 9/1996 |
| JP | 11-039309 | 2/1999 |
| JP | 11-288418 | 10/1999 |
| JP | 11-312248 | 11/1999 |
| JP | 2000-235639 | 8/2000 |
| JP | 2005-327065 | 11/2005 |

OTHER PUBLICATIONS

Japanese Office Action dated Sep. 12, 2008 in corresponding Japanese Application No. 2004-337947.
U.S. Appl. No. 11/598,026 (Shiiyama), pending.

* cited by examiner

*Primary Examiner*—Matthew C Bella
*Assistant Examiner*—Alex Liew
(74) *Attorney, Agent, or Firm*—Fitzpatrick, Cella, Harper & Scinto

(57) ABSTRACT

This invention has as its object to allow high-precision and high-speed retrieval in consideration of position information of image feature amounts upon retrieving similar images based on image feature amounts, even when the position information includes some differences. To achieve such object, an image processing apparatus according to this invention has the following arrangement. That is, an image processing apparatus for calculating a similarity between different image data, includes a first generation unit configured to generate feature amount matrices on the basis of feature amounts of the image data acquired by dividing the different image data into a plurality of blocks, a calculation unit configured to calculate a distance between feature sequences which form the generated feature amount matrices by DP matching, and a second generation unit configured to generate a line penalty matrix by two-dimensionally arranging the calculated distances between the feature sequences, and calculates a similarity between the different image data by DP matching using the line penalty matrix.

7 Claims, 22 Drawing Sheets

FIG. 3

| IMAGE ID (301) | IMAGE DATA (302) |
|---|---|
|  |  |
|  |  |
|  |  |
| ⋮ | ⋮ |

FIG. 4

| IMAGE ID | FULL-PATH FILE NAME | LABEL MATRIX | ANOTHER ATTRIBUTE | . . . |

FIG. 9A

| 1 | 2 | 3 |
|---|---|---|
| 4 | 5 | 6 |
| 7 | 8 | 9 |

FIG. 9B

| 3 | 2 | 1 |
|---|---|---|
| 6 | 5 | 4 |
| 9 | 8 | 7 |

FIG. 9C

| 7 | 8 | 9 |
|---|---|---|
| 4 | 5 | 6 |
| 1 | 2 | 3 |

FIG. 9D

| 9 | 8 | 7 |
|---|---|---|
| 6 | 5 | 4 |
| 3 | 2 | 1 |

FIG. 9E

| 1 | 2 | 3 | 4 |
|---|---|---|---|
| 9 | 10 | 11 | 12 |
| 5 | 6 | 7 | 8 |
| 13 | 14 | 15 | 16 |

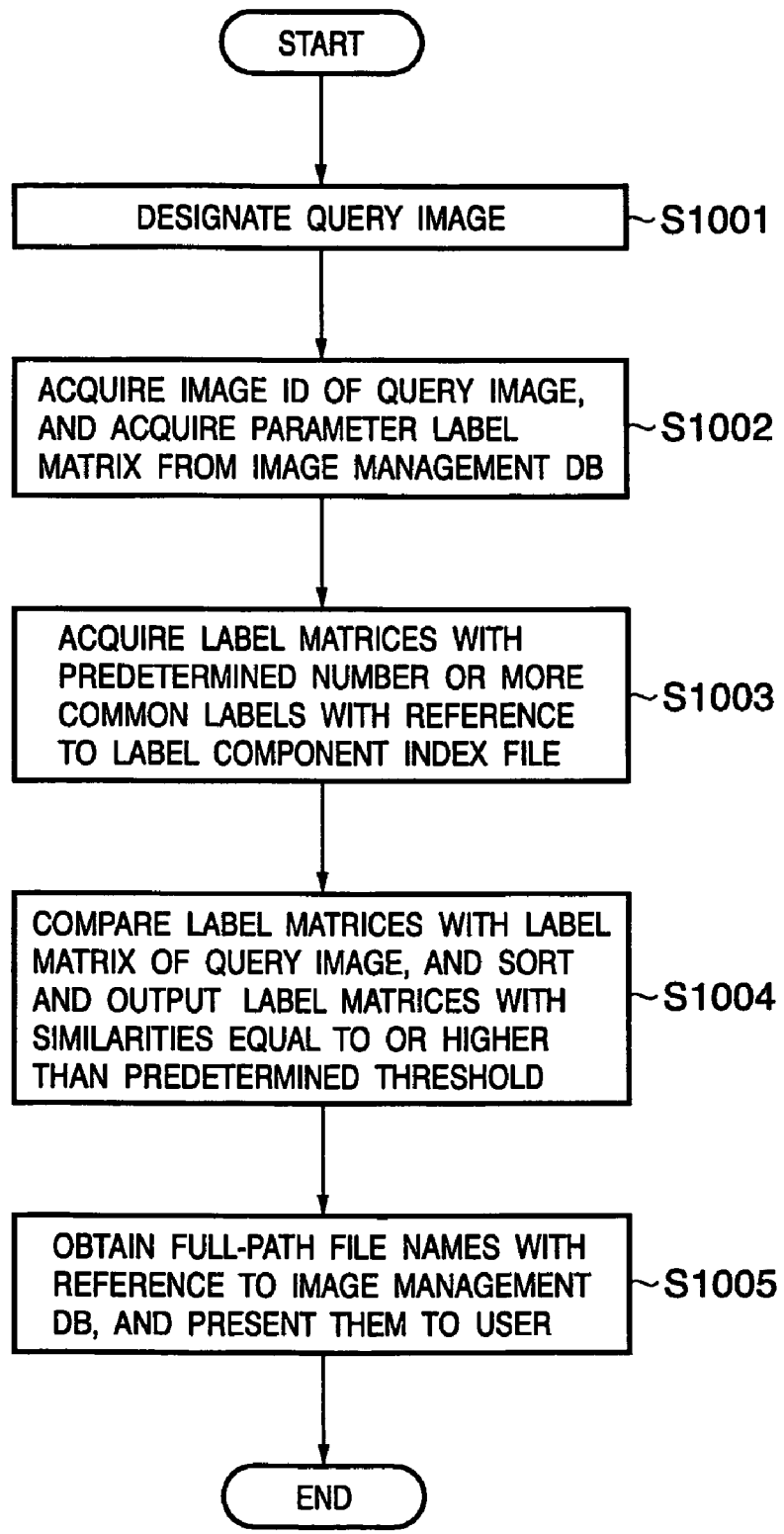

FIG. 11

|   | 1 | 2 | 3 | 4 | 5 | 6 | 7 | 8 | ······ |
|---|---|---|---|---|---|---|---|---|---|
| 1 | 0 | 1 | 1 | 5 | 1 | 5 | 7 | 7 | ······ |
| 2 |   | 0 | 2 | 1 | 1 | 7 | 2 | 5 | ······ |
| 3 |   |   | 0 | 7 | 1 | 1 | 5 | 2 | ······ |
| 4 |   |   |   | 0 | 1 | 9 | 1 | 7 | ······ |
| ⋮ |   |   |   |   |   |   |   |   |   |

IMAGE PROCESSING APPARATUS, IMAGE PROCESSING METHOD, PROGRAM, AND STORAGE MEDIUM

FIELD OF THE INVENTION

The present invention relates to an image processing technique for retrieving an image.

BACKGROUND OF THE INVENTION

Conventionally, various techniques for retrieving similar images have been proposed. As the most popular example, a method of giving keywords to images, and conducting image retrieval based on this keyword is known. Although similar images can be retrieved with high precision, in this method, the user must append keywords to each image. Furthermore, the user must manually select images without keywords, resulting in poor usability. For this reason, in terms of improvement of the usability, image feature amounts are automatically extracted from images, and similar images are retrieved using the image feature amounts.

As a method of extracting image feature amounts from images, and retrieving similar images using the extracted image feature amounts, a method of using color information as image feature amounts predominates. Most of these methods conduct retrieves using image feature amounts such as the RGB ratio, calculated by taking a histogram associated with color information, combinations of colors which frequently appear in images, and the like. However, in case of similar image retrieval based on such a method, since position information of a color is lost, high retrieval precision cannot be expected.

Hence, recently, as described in, e.g., Japanese Patent Laid-Open No. 8-249349, a method of dividing an image into a plurality of blocks, and making pattern matching using respective image feature amounts (representative colors) to retrieve for similar images using the position information of colors has been proposed.

Furthermore, Japanese Patent Laid-Open No. 11-288418 (U.S. Pat. No. 6,584,223) proposes, as a similar image retrieval method that considers an array of image feature amounts, a method of specifying a similar line array by performing only matching for respective lines and making matching for respective sequences by re-using the similar line array to calculate a similarity.

However, in case of the similar image retrieval method disclosed in Japanese Patent Laid-Open No. 8-249349, distances between image feature amounts must be calculated for respective blocks between two images which are to undergo matching, resulting in huge computation volumes. Calculations are further complicated when three representative colors are used as image feature amounts, i.e., R, G, and B data.

Since comparison is made using image feature amounts themselves extracted from the images, high comparison precision is assured. However, similar image retrieval is not possible when the angle of an image has changed or when an object position has changed. Hence, this method is not suitable for similar image retrieves such as so-called "natural images".

On the other hand, in case of the similar image retrieval method disclosed in Japanese Patent Laid-Open No. 11-288418, since a similar line array is specified without any matching for respective lines, the computation volume can be reduced compared to Japanese Patent Laid-Open No. 8-249349. However, as in Japanese Patent Laid-Open No. 8-249349, when a so-called "natural image" is selected as an object, a similar line array cannot be normally specified. As a result, the similarity precision drops. With this method, when a similar line array is not normally specified, the positional relationship between the query and test images cannot be correctly extracted.

Based on such background, it is demanded to implement so-called robust similar image retrieval which can conduct similar image retrieves with ambiguity that can absorb differences even when the image angle has changed, when the object position has changed, or when image feature amounts have some differences due to a change in photographing condition.

SUMMARY OF THE INVENTION

The present invention has been made in consideration of the above problems, and has as its object to allow high-precision and high-speed retrieves in consideration of position information of image feature amounts upon retrieving similar images based on image feature amounts, even when the position information includes some differences.

In order to achieve the above object, an image processing apparatus according to the present invention comprises the following arrangement.

That is, there is provided an image processing apparatus for calculating a similarity between image data, comprising:

a first generation unit configured to generate a feature amount matrix by dividing image data into a plurality of blocks, and sorting image feature amounts of the image data acquired for the respective blocks in a predetermined order;

a matching unit configured to calculate a distance between a first feature amount sequence as a feature amount sequence for each line which forms a feature amount matrix of first image data generated using the first generation unit, and a second feature amount sequence as a feature amount sequence for each line which forms a feature amount matrix of second image data generated using the first generation unit by Dynamic Programming ("DP") matching; and a second generation unit configured to generate a two-dimensional array by two-dimensionally arranging distances for the respective lines calculated by the matching unit as line penalties in correspondence with an array of the first feature amount sequences and an array of the second feature amount sequences, wherein a similarity between the first and second image data is calculated by DP matching using the two-dimensional array generated by the second generation unit.

According to the present invention, upon retrieving similar images based on image feature amounts, high-precision and high-speed retrieves can be conducted in consideration of position information of image feature amounts even when the position information includes some differences.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view for explaining the storage state of image data in an image storage unit;

FIG. 4 is a view for explaining the storage state of image data by an image management DB;

FIGS. 9A to 9E are views for explaining block order sequences used upon generating a label matrix;

FIG. 10 is a flowchart for explaining the sequence of similar image retrieval processing;

FIG. 11 shows an example of a penalty matrix between labels used upon calculating a similarity by comparing label sequences;

DETAILED DESCRIPTION OF THE PREFERRED EMBODIMENTS

Preferred embodiments of the present invention will now be described in detail in accordance with the accompanying drawings.

First Embodiment

Figure 1:
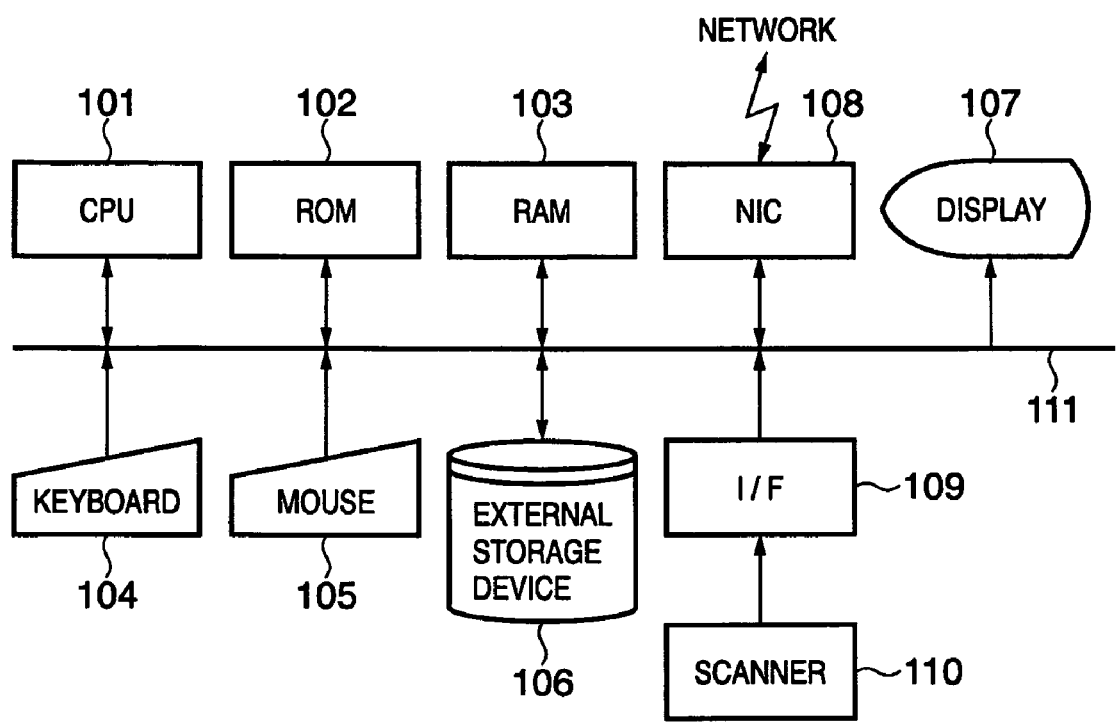
FIG. 1 is a block diagram showing the control arrangement of an image processing apparatus which is common to respective embodiments of the present invention.

FIG. 1 is a block diagram showing the control arrangement of an image processing apparatus which is common to respective embodiments of the present invention. Referring to FIG. 1, reference numeral 101 denotes a CPU which executes various kinds of control processing. Reference numeral 102 denotes a ROM which stores a boot program executed upon starting up this image processing apparatus, and various data. Reference numeral 103 denotes a RAM which stores a control program used when the CPU 101 executes processing, and provides a work area used when the CPU 101 executes various kinds of control processing. Reference numeral 104 denotes a keyboard; and 105, a mouse. These keyboard and mouse provide various input operation environments by the user.

Reference numeral 106 denotes an external storage device which comprises a hard disk, floppy® disk, CD-ROM, or the like. Reference numeral 107 denotes a display which informs the user of the processing contents and processing results. Reference numeral 108 denotes a network interface which allows communications with various devices (not shown) on a network. Reference numeral 109 denotes an interface (I/F); and 110, a scanner used to scan an image. Reference numeral 111 denotes a bus which connects the above components. Of the above components, the scanner 110 and external storage device 106 may use those which are connected on the network.

Figure 2:
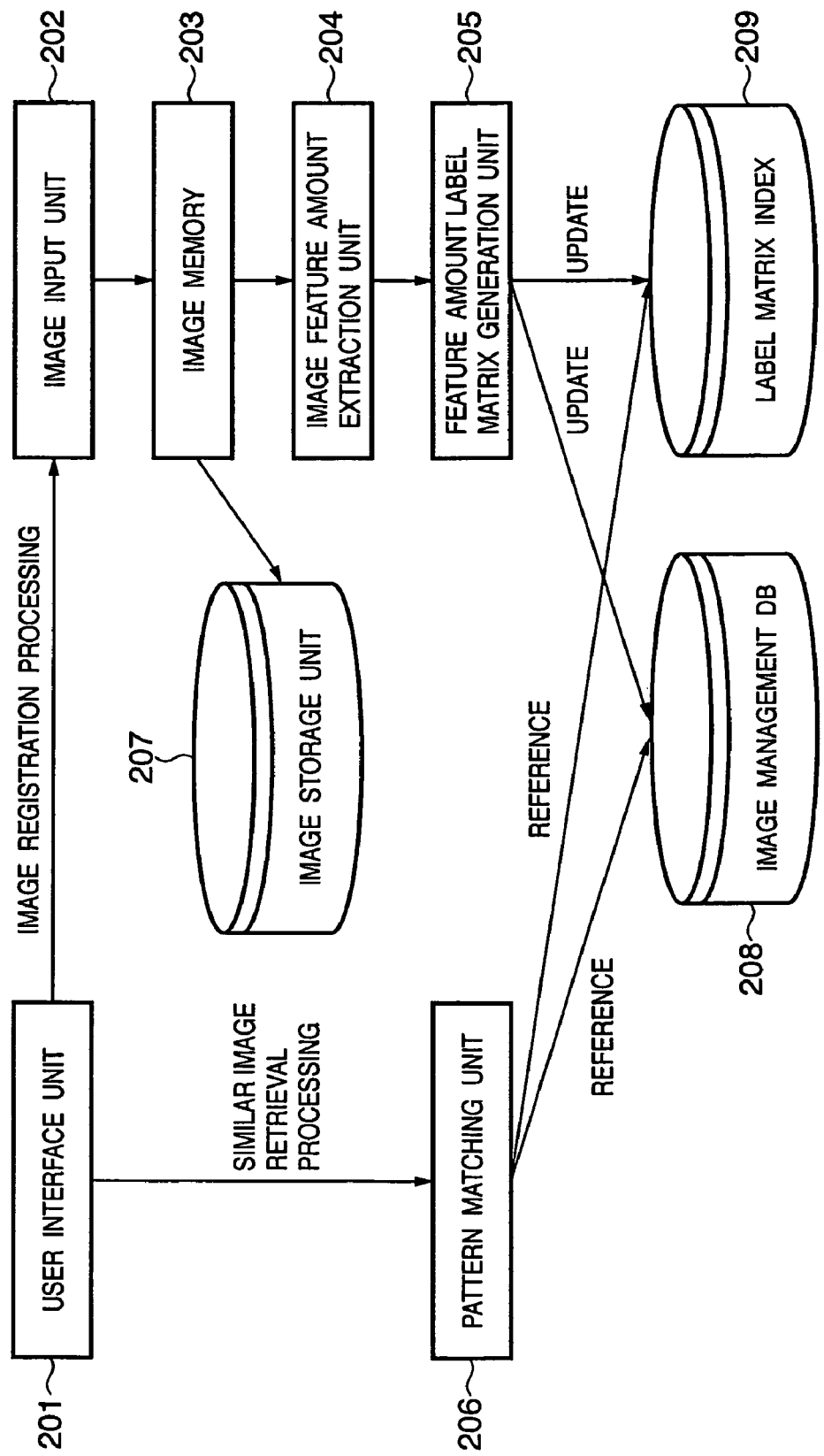
FIG. 2 is a block diagram showing the functional arrangement of the image processing apparatus which is common to respective embodiments of the present invention.

FIG. 2 is a block diagram showing the functional arrangement of the image processing apparatus which is common to respective embodiments of the present invention. Referring to FIG. 2, reference numeral 201 denotes a user interface unit which detects various operation inputs from the user via the display 107, keyboard 104, and mouse 105. Reference numeral 202 denotes an image input unit which scans an image using the scanner 110. Reference numeral 203 denotes an image memory which stores image data obtained by the image input unit 202 in a predetermined area of the RAM 103. Reference numeral 204 denotes an image feature amount extraction unit which extracts image feature amounts in a sequence to be described later from an image stored in the image memory 203.

Reference numeral 205 denotes a feature amount label matrix generation unit, which generates a label matrix (feature amount matrix) on the basis of the image feature amounts obtained by the image feature amount extraction unit 204. Reference numeral 206 denotes a pattern matching unit which calculates similarities using two-dimensional Dynamic Programming ("DP") matching (to be described later) for a label matrix of the designated image, and those of images stored in an image storage unit 207.

Figure 3:
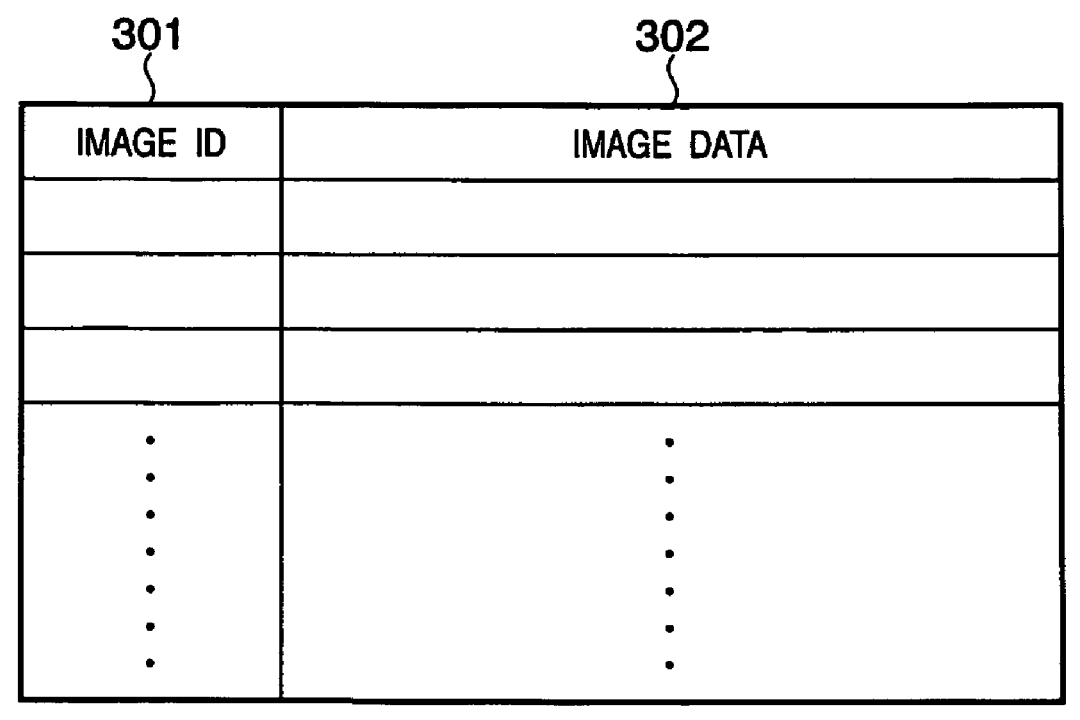

Reference numeral 207 denotes an image storage unit which stores image data obtained by the image input unit 202 and the like. FIG. 3 is a view for explaining the storage state of image data in the image storage unit 207. An image ID 301 is assigned to each image data 302, and the image storage unit 207 holds them as a pair.

Reference numeral 208 denotes an image management DB (to be referred to as an image management DB hereinafter), which manages image data stored in the image storage unit 207 in a data format shown in FIG. 4. Reference numeral 209 denotes a label matrix index which stores a label component index file shown in FIG. 5. Note that use of the label component index 209 will be described later using the flowchart of FIG. 10.

An operation example of the image processing apparatus according to this embodiment with the aforementioned arrangement will be described below. Note that a description of the following example will be given under the condition that three colors, i.e., red (R), green (G), and blue (B) are used as image feature amounts focused on colors, and processing on a three-dimensional color space is to be executed. Needless to say, processing may be done on a color space such as an L*a*b* color system or the like, or on a color space other than the three-dimensional color space.

[Image Registration Processing]

Figure 6:
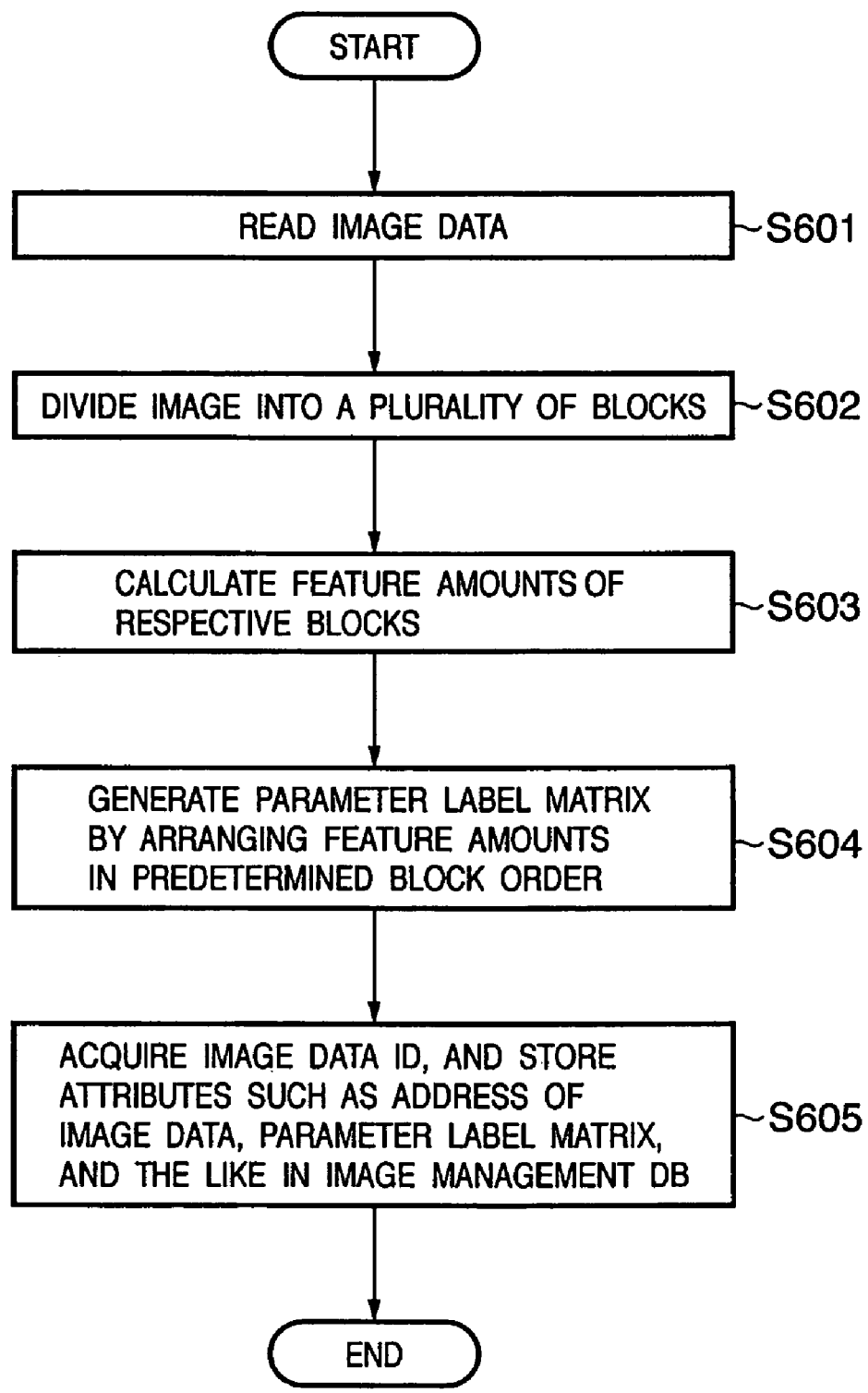
FIG. 6 is a flowchart for explaining the sequence of image registration processing.

Processing executed upon image registration will be explained first. FIG. 6 is a flowchart showing the sequence of the image registration processing. As shown in FIG. 6, the image input unit 202 loads an image and stores the image in the image memory 203 in step S601 on the basis of an instruction input by the user via the user interface unit 201.

Figure 7:
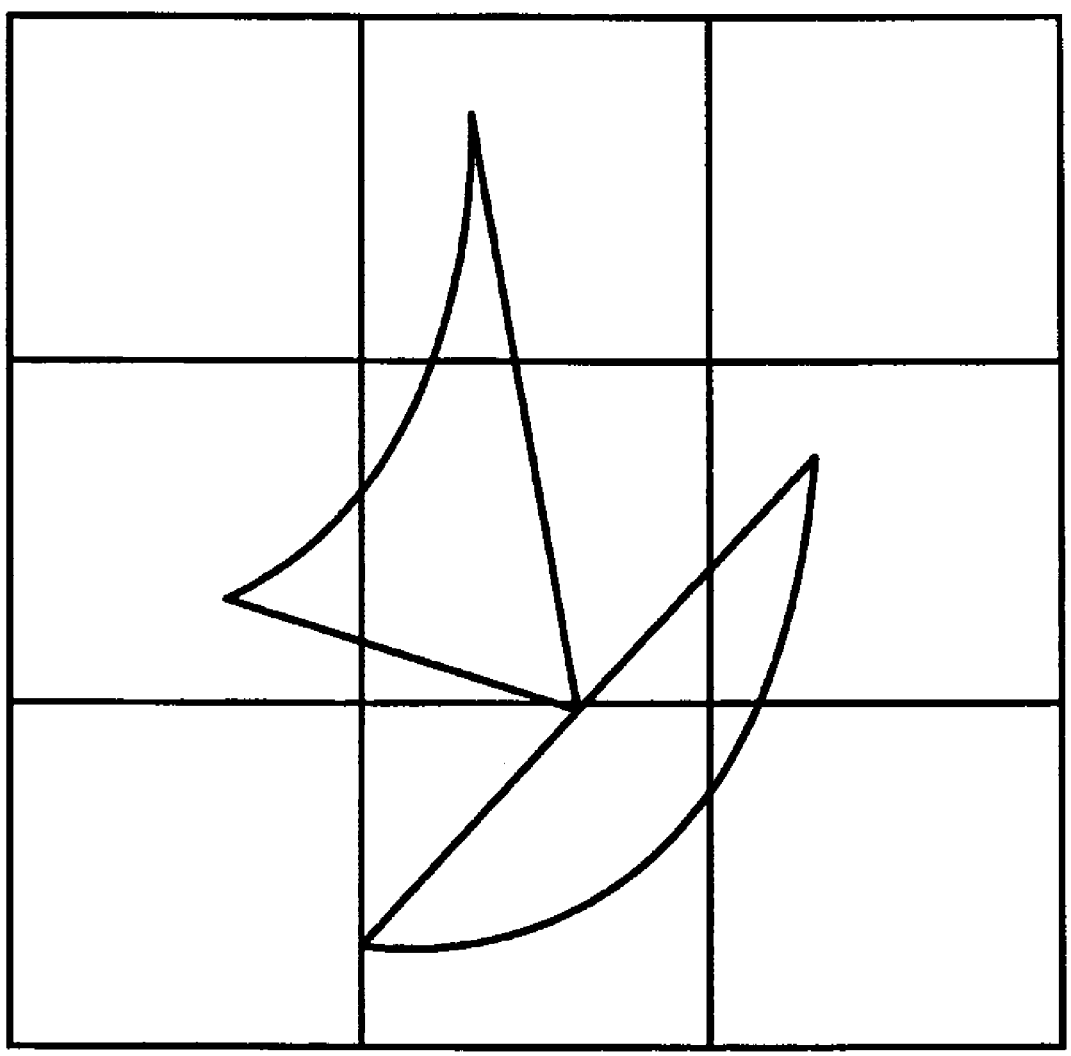
FIG. 7 shows an example of block division of an image.

In step S602, the image is divided into a plurality of blocks. In this embodiment, the image is divided into vertical and horizontal blocks. FIG. 7 shows an example of block division of an image in this embodiment. As shown in FIG. 7, in this embodiment, an image is divided into a total of 9 (=3×3) blocks. Note that division into 3×3 blocks like in this embodiment is made for the sake of convenience. In practice, for example, a natural image is preferably divided into 10×10 blocks or more. In case of an image including an article image on a white plain background, it is preferably divided into 13×13 blocks or more.

In step S603, image feature amounts (parameter labels) of the divided blocks are calculated.

Figure 8:
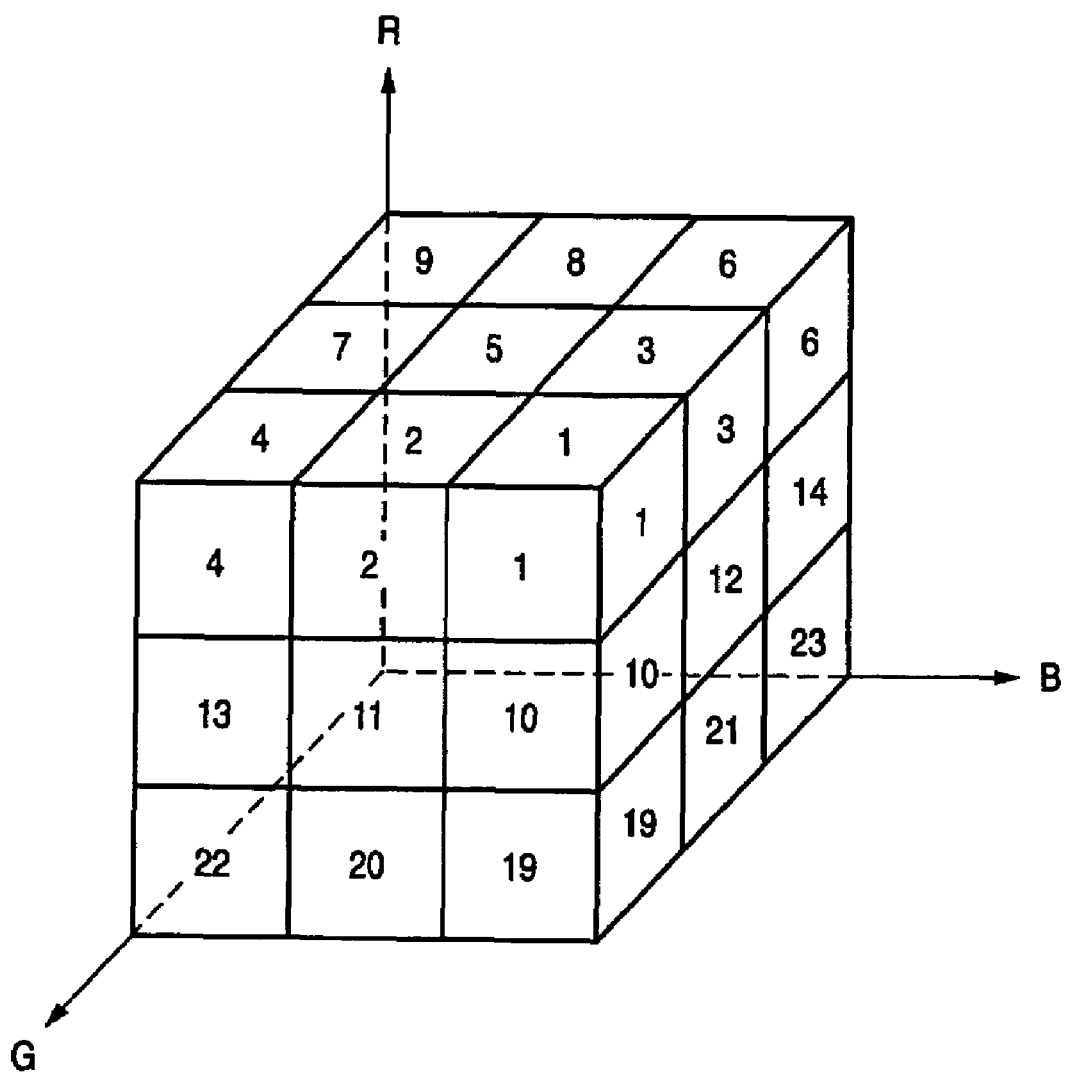
FIG. 8 is a view for explaining a multi-dimensional feature amount space.

FIG. 8 is a view for explaining a multi-dimensional feature amount space used upon calculating the image feature amounts of the divided blocks. As shown in FIG. 8, the multi-dimensional feature amount space is divided into a plurality of cells (color cells), and unique labels are assigned to respective cells (color cells) using serial numbers.

To which cell on the multi-dimensional feature amount space color components (R, G, B) in each divided block belong is determined to calculate an image feature amount (parameter label) of that block.

More specifically, calculation processing for determining to which color cell all pixels belong is executed for each divided block, and the label of a color cell with a highest frequency of occurrence is determined as a parameter label ("color label") of the divided image block of interest. This processing is applied to all blocks.

The reason why the multi-divisional feature amount space (RGB color space) is divided into a plurality of blocks is to absorb subtle feature amount (color) differences.

Upon calculating image feature amounts using the multi-divisional feature amount space, data which are transformed into those in a significant dimension are used by executing orthogonal transformation such as principal component analysis or the like, after color components (R, G, B) are standardized (normalized) by experimentally calculating their average values and variance values. Note that the "significant dimension" means a dimension specified by a principal component axis with a large contribution ratio in the principal component analysis.

After the parameter labels are assigned to the respective blocks, a parameter label matrix (to be referred to as "label matrix" hereinafter) is generated by sorting the parameter labels assigned to the blocks in a predetermined block order in step S604.

FIGS. 9A to 9E are views for explaining the block order sequences used upon generating the label matrix. The label matrix is generated by sorting the parameter labels in accordance with numerical values in boxes of the divided image blocks in FIGS. 9A to 9E. Upon storing the label matrix in the image management DB 208 or label matrix index 209, data obtained by linearly sorting the two-dimensional label matrix in a predetermined order is stored. In this embodiment, such data in the linear format is also called a label matrix.

In the order of FIG. 9A, the divided image blocks are scanned from the left to right in the horizontal direction, and this horizontal scan is made from the up to down. The scan method which can be applied to this method includes:

horizontal direction (four different scan methods are available such as a left-to-right scan which is made from the down to up, and the like, as shown in FIGS. 9B to 9D, in addition to the order that makes the left-to-right scan from the up to down, as shown in FIG. 9A);

vertical direction (four different scan methods are available such as an up-to-down scan which is made from the left to right, and the like);

independent scans for even and odd lines, as shown in FIG. 9E; and so forth.

Note that this embodiment adopts an oblique scan from the upper left corner in the lower right direction, but other scan methods described above may be applied, as shown in FIG. 9A.

In step S605, the label matrix obtained in this way, and image data are stored in the image storage unit 207, image management DB 208, label matrix index 209. That is, an image ID is acquired in correspondence with the image data loaded in step S601, and the image data and its image ID are stored in the image storage unit 207 as a pair. An image management DB recorded shown in FIG. 4 is generated in association with this image ID, and is registered in the image management DB 208. In this way, the image registration processing ends.

[Similar Image Retrieval Processing]

About Label Component Index File

The similar image retrieval processing will be described below. The label component index file used in the similar image retrieval processing will be explained first.

Assume that in this embodiment, upon initialization, label matrices of already registered images are acquired in advance from the label matrix index 209, and label component index files (501, 502, 503, . . . , and the like in FIG. 5) are generated to have respective label components as keys and are stored in the label matrix index 209. Note that "initialization" may correspond to either the startup timing of the system or the launch timing of an application. Also, when a new image is registered in the image management DB, this label component index file (209) is generated.

Figure 5:
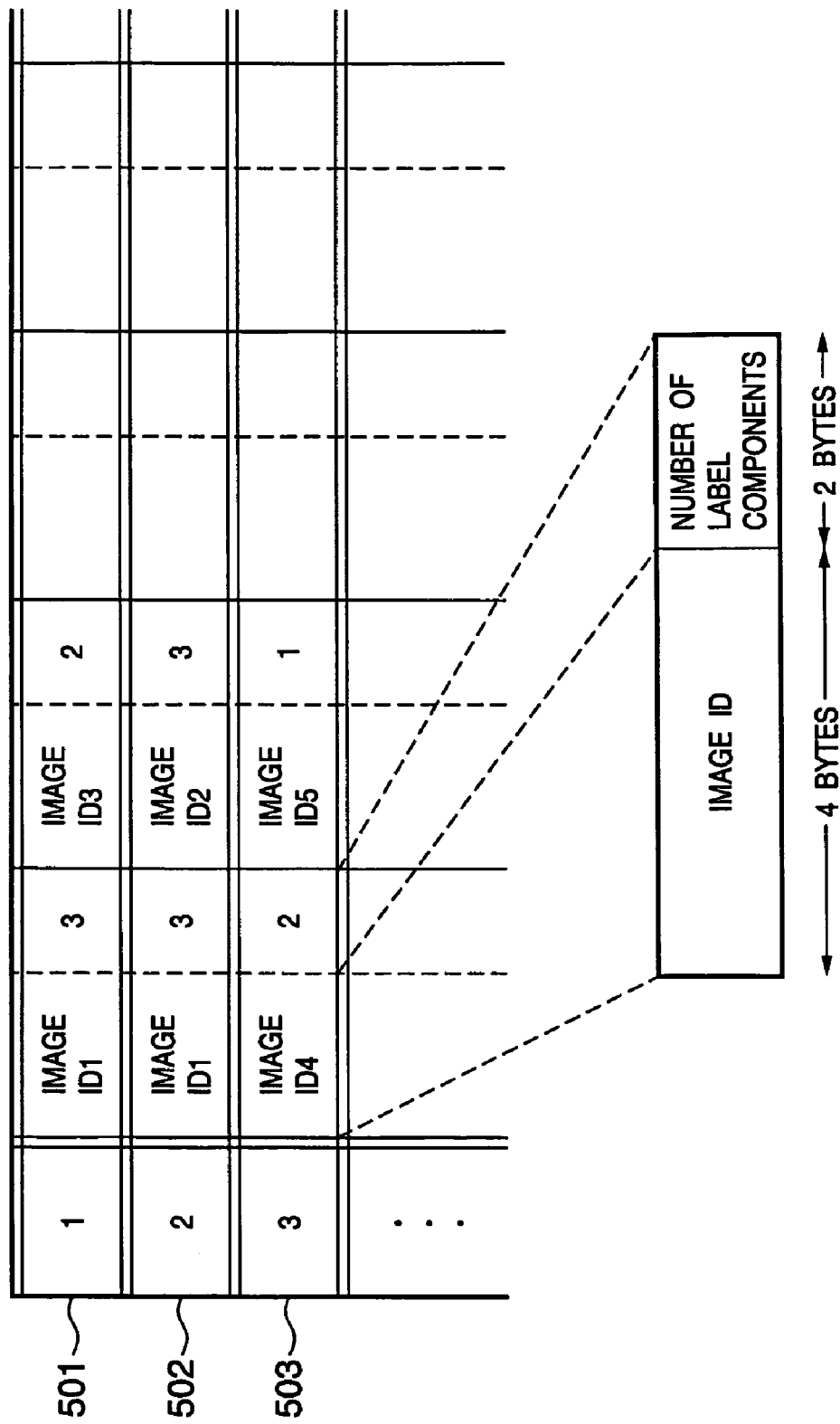
FIG. 5 is a view showing a data configuration example of a label component index.

FIG. 5 shows an example of the data configuration of the label matrix index 209. As shown in FIG. 5, the label matrix index 209 includes a plurality of label component index files (501, 502, 503, . . . , and the like). Each label component index file has an address group (sequence ID group) to label matrices including that label component. Note that this label component index file need not be re-generated until registration, deletion, and change of an image must be reflected. Of course, every time image data is registered, the label component index file may be added to the label matrix index 209. In this case, after step S605 in FIG. 6, the aforementioned processing is executed for a newly registered image.

The label component index file shown in FIG. 5 stores, using its label component as a key, an image ID including that label component, and the number of label components included in the image ID. Using such index, an image ID of image data including a label component of a query image can be directly extracted. When image IDs stored for respective keys are sorted and registered in ascending or descending order of the number of label components, the processing speed can be further improved.

Flow of Similar Image Retrieval Processing

The similar image retrieval processing will be described below using FIG. 10. FIG. 10 is a flowchart for explaining the processing sequence of the similar image retrieval processing in the image processing apparatus according to this embodiment. If a "query image" is designated from the user interface unit 201 in step S1001, the image ID 301 of the designated query image is acquired, and a label matrix (a color label matrix in this case) of the query image is also acquired from the image management DB 208 in step S1002.

In step S1003, label matrices which include a predetermined number or more of identical labels to those of the label matrix of the query image are acquired with reference to the label component index files. Since the processing slows down if comparison is made with the label matrices of all the registered images, similar label matrices (those including a predetermined number or more of identical labels to those of the label matrix of the query image) are narrowed down, and are then compared with the label matrix of the query image on one-to-one level, thus improving the processing speed. Of course, if slow processing is not minded, comparison with the label matrices of the label component index files of all the registered images is made to conduct high-precision retrieval (in this case, step S1003 is omitted).

In step S1004, the label matrices acquired in step S1003 are compared with that of the query image to calculate their similarities. Then, the label matrices are output as a retrieval result in turn from that which is most similar to the label matrix of the query image together with their similarities.

In step S1005, full-path file names of respective image IDs are acquired with reference to the image management DB 208, and are presented to the user.

About Penalty Matrix Used in Similarity Calculation Processing

A penalty matrix used in similarity comparison (calculation of a similarity) between label matrices will be described below. Note that each of the label matrices acquired in step S1003 will be referred to as a "test image" hereinafter.

Figure 11:
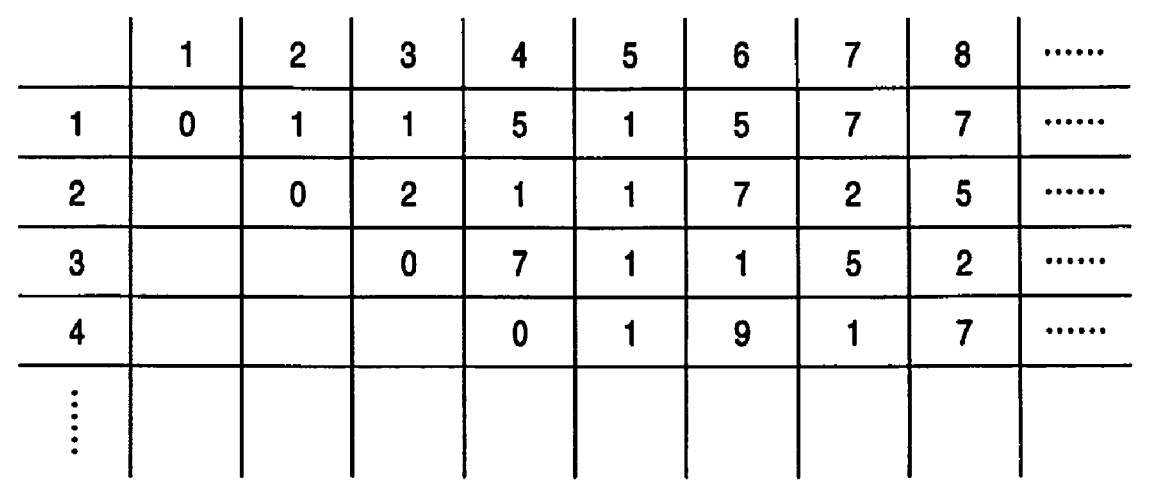

FIG. 11 shows an example of a "penalty matrix" between labels used upon comparing the label matrices and calculating their similarity. A similarity becomes higher with decreasing value (penalty) in the penalty matrix. For example, a penalty between labels 2 and 6 is "7". Also, a penalty between the same labels is "0", as a matter of course. The use purpose of the penalty matrix is to make distance determination according to a similarity between labels. That is, since this embodiment uses the RGB color space as the multi-dimensional feature amount space, distance determination can be made in accordance with a color similarity.

For example, distances between label components at corresponding positions of those in the label matrices of the query and test images are calculated with reference to the penalty matrix shown in FIG. 11, and the sum of the distances for all label components in the label matrices is calculated, thus obtaining a distance between two label matrices.

Figure 12:
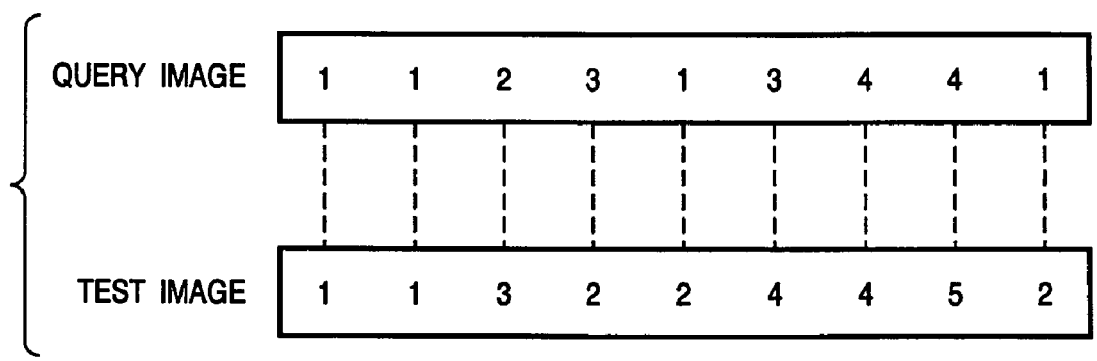
FIG. 12 shows label matrices of query and test images.
Figure 13:
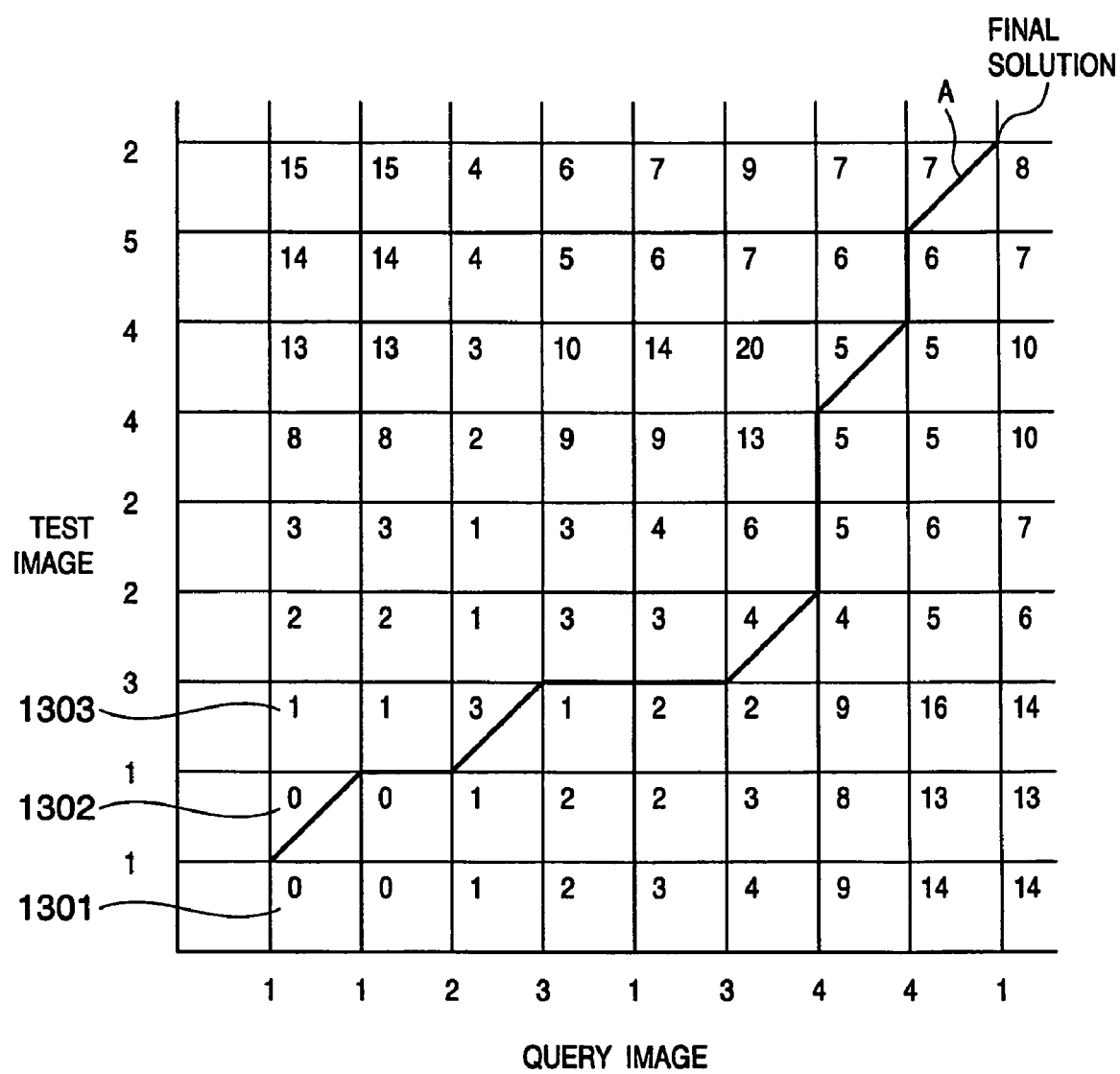
FIG. 13 is a view for explaining calculation of a distance between label sequences by DP matching.

For example, in an example shown in FIG. 12, since the query image has a label matrix "112313441" and the test image has a label matrix "113224452", DP matching is done using the penalty matrix shown in FIG. 11, thus obtaining a distance (final solution), as shown in FIG. 13.

FIG. 13 shows the process for calculating the distance between the label matrices of the query and test images by making DP matching using the penalty matrix shown in FIG. 11. FIG. 13 will be briefly explained below.

In FIG. 13, the abscissa plots label components of the query image, and the ordinate plots those of the test image.

A numerical value described at an intersection between corresponding label components of the query and test images is the sum value of penalties. For example, since the first label component of those of the query image is "1", and the first label component of those of the test image is "1", "0" is described at their intersection as a penalty (see 1301).

Likewise, at an intersection between the first label component "1" of the query image and the second label component "1" of the test image, "0" obtained by adding "0" as a penalty between "1" and "1" to the previous penalty "0" (1301) is described (see 1302). Furthermore, at an intersection between the first label component "1" of the query image and the third label component "3" of the test image, "1" obtained by adding "1" as a penalty between "1" and "3" to the previous penalty "0" (1302) is described (see 1303). The values between the first label component of the query image and the label components of the test image are sequentially described. As values of subsequent intersections, a value at an intersection is similarly calculated and described using a smaller one of vertically or horizontally preceding values.

Upon calculating the distance between the label matrices of the query and test images, the lower left position of FIG. 13 (the intersection between the first label components of the query and test images) is set as a start point, the upper right position of FIG. 13 (the intersection between the ninth label components of the query and test images) is set as an end point, and penalties at respective intersections from the start point to the end point are calculated, thus obtaining a final solution (the final solution is 8 in the example of FIG. 13). Note that a path (A) from the start point to the end point is selected to minimize the final solution (in the example of FIG. 13, a path in which the sums of penalties are 0→0→1→1→2→2→4→5→5→5→6→8 is that yields the final solution=8).

Figure 14:
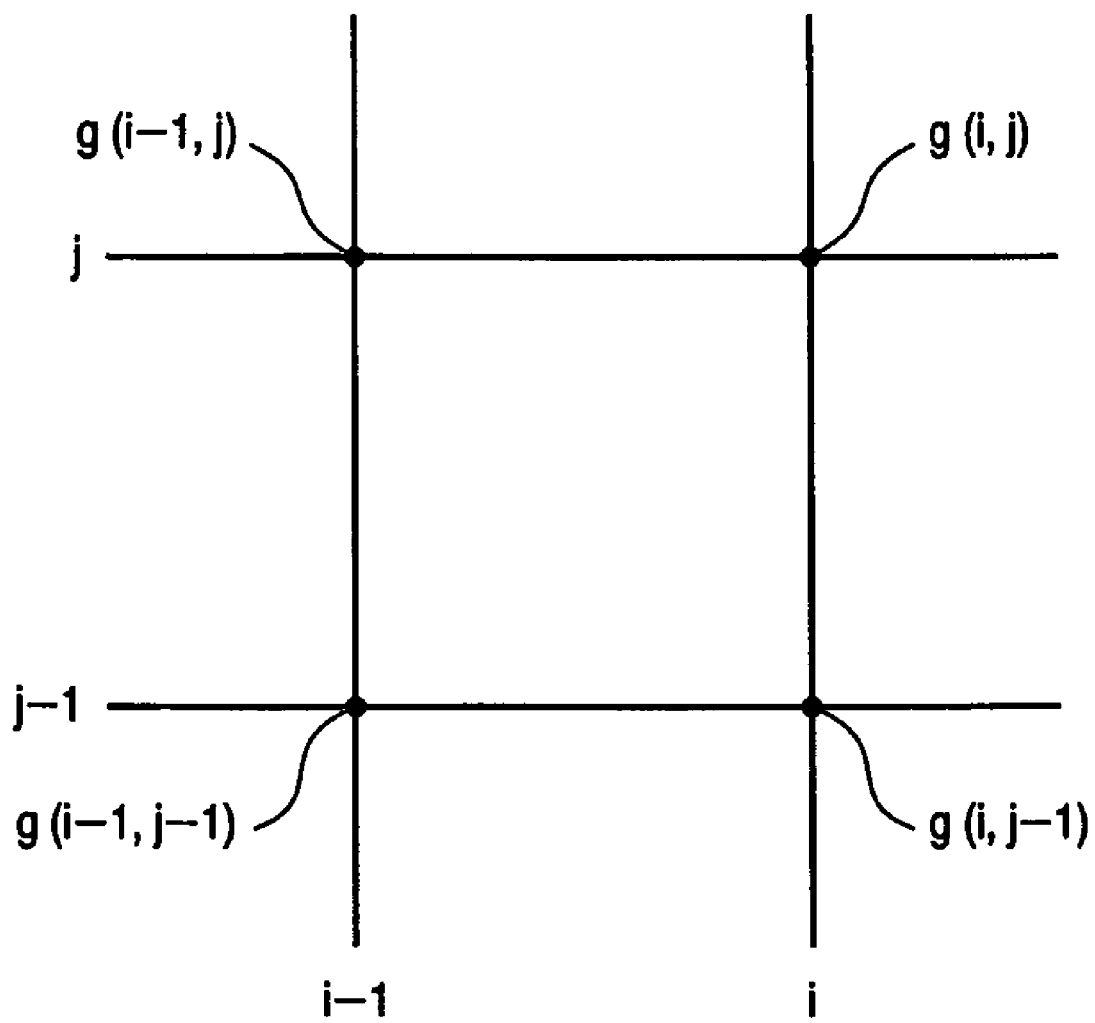
FIG. 14 is a view for explaining path selection by DP matching.

Note that the path is selected using the following condition as a slope limitation. That is, in FIG. 14, if penalties at intersections (i−1, j), (i−1, j−1), and (i, j−1) are respectively g(i−1, j), g(i−1, j−1), and g(i, j−1), and a penalty at an intersection (i, j) is d(i, j), a penalty g(i, j) at the intersection (i, j) is calculated by a recurrence equation described by:

$$g(i, j) = \min \begin{cases} g(i, j-1) + d(i, j) \\ g(i-1, j-1) + 2 \cdot d(i, j) \\ g(i-1, j) + d(i, j) \end{cases} \quad (1)$$

In this manner, in the image processing apparatus according to this embodiment, the penalty matrix between labels shown in FIG. 11 is introduced to give a smaller penalty (distance) to neighboring labels and to give a larger penalty to farther ones upon pattern matching between the label matrices.

Overview of Similarity Calculation Processing

In step S1004, the label matrices are compared in consideration of this penalty matrix. In this embodiment, two-dimensional DP matching (to be referred to as 2D DP matching hereinafter) to be described below is used in comparison.

Figures 15A, 15B, 15C:
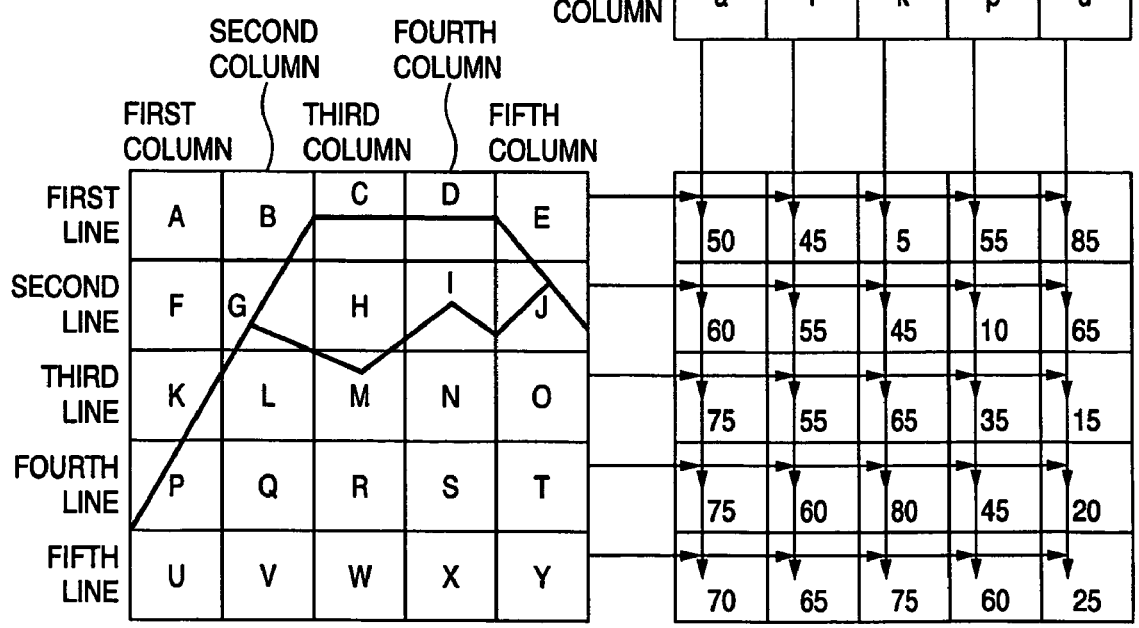
FIGS. 15A to 15C are views for explaining similarity calculation processing.

FIGS. 15A to 15C and FIG. 16 are views for explaining the similarity calculation processing in the image processing apparatus according to this embodiment. The label matrix of the query image acquired in step S1002 can be sorted, as shown in FIG. 15A, in accordance with its scan method. If one of the label matrices extracted in step S1003 is selected as a test image, the label matrix can be sorted, as shown in FIG. 15B.

The distance between the label matrices of a label sequence (feature sequence) "ABCDE" in the first line of the query image, and a label sequence "abcde" in the first line of the test image is calculated by DP matching, and are stored at a corresponding position of a line penalty matrix (two-dimensional matrix; see FIG. 15C) as a line penalty. The aforementioned processing is applied to combinations of all lines ("ABCDE", "FGHIJ", "KLMNO", "PQRST", and "UVWXY") of the query image and all lines ("abcde", "fghij", "klmno", "pqrst", and "uvwxy") of the test image, thus obtaining the line penalty matrix shown in FIG. 15C.

FIG. 15C indicates that the line penalty between "ABCDE" and "abcde" is "50", that between "ABCDE" and "fghij" is "45", and so forth.

Figure 16:
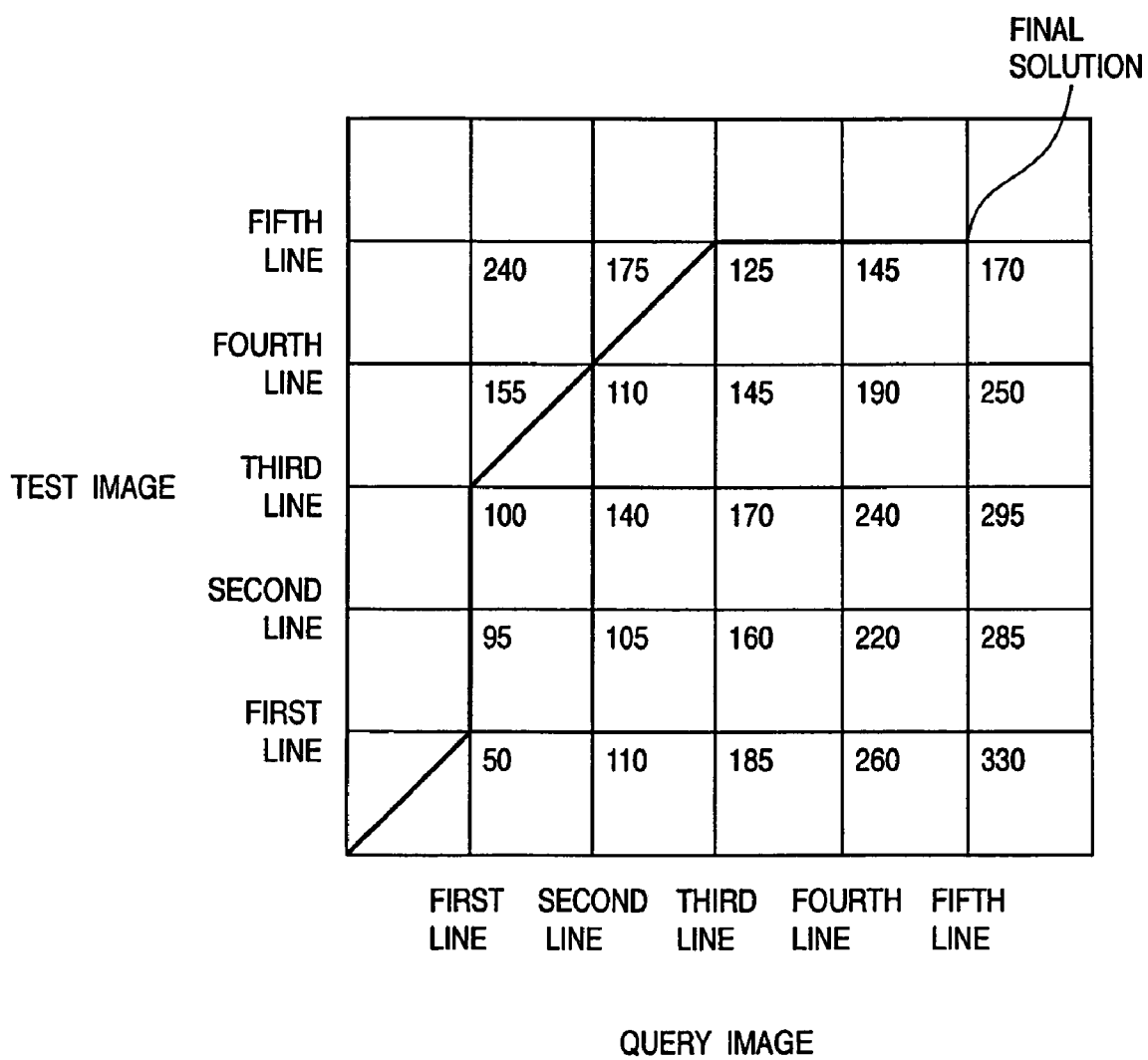
FIG. 16 is a view for explaining similarity calculation processing.

The line penalty matrix is sorted, as shown in FIG. 16, as penalties between the line matrices, and a similarity is calculated using DP matching and is output as that between the query and test images. As is well known, DP matching executes processing for performing comparison by warping a label sequence to be compared (to have patience without advancing a partner to be compared to the next) (in the example of FIG. 16, the final solution is 170, and the sum values of line penalties go through a path 50→95→100→110→125→145→170). Note that a warp (patience) limit may be given as a constrained condition (the matching window width).

Flow of Similarity Calculation Processing

Figure 17:
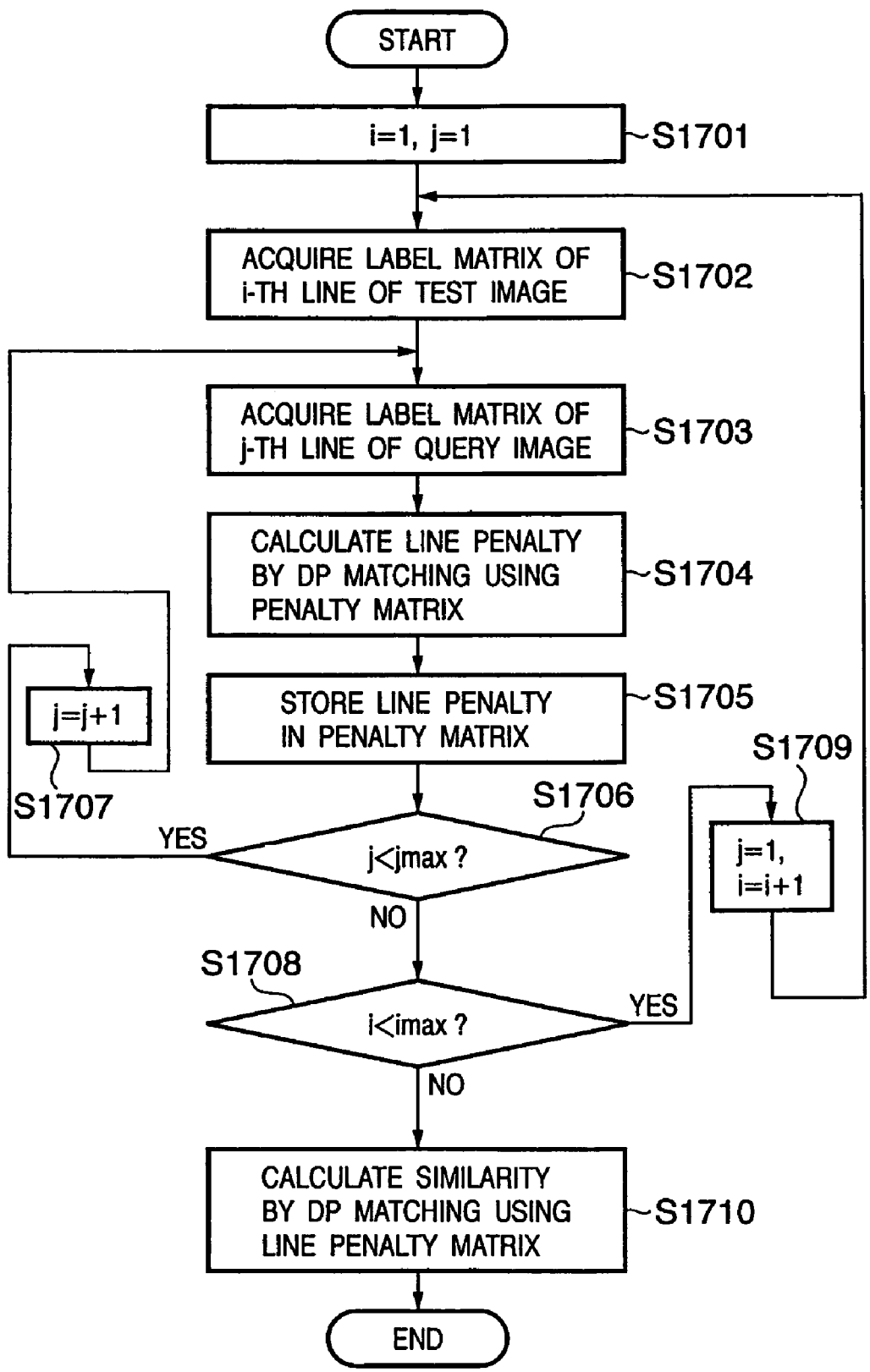
FIG. 17 is a flowchart for explaining the sequence of similarity calculation by two-dimensional DP matching.

FIG. 17 is a flowchart showing the sequence of similarity calculation using 2D DP matching in the image processing apparatus according to this embodiment. The processing that has been explained with reference to FIGS. 15A to 15C and FIG. 16 will be described in detail below with reference to the flowchart of FIG. 17.

In step S1701, a variable i indicating the line number of the test image and a variable j indicating that of the query image are initialized to 1 both to indicate the first line.

In step S1702, a label sequence in the i-th line of the test image is acquired. For example, in case of FIG. 15B, if i=1, a sequence "abcde" is acquired. In step S1703, a label sequence in the j-th line of the query image is acquired. For example, in FIG. 15A, if j=1, a sequence "ABCDE" is acquired.

In step S1704, the distance (line penalty) between the two label sequences obtained in steps S1702 and S1703 is calculated by DP matching using the color cell penalty matrix described using FIG. 11. In step S1705, the line penalty obtained in step S1704 is stored in a line penalty matrix.

The processes in steps S1703 to S1705 are applied to all the lines of the query image (steps S1706 and S1707). Furthermore, the processes in steps S1703 to S1707 are applied to all the lines of the test image (steps S1708 and S1709). In this manner, the distances between the label lines of the query and test images are stored as line penalties in the line penalty matrix.

Finally, 2D DP matching between a standard line matrix "12 . . . imax" of the test image and a standard line matrix "12 . . . jmax" of the query image is made to calculate a similarity between them (step S1710). Note that the standard line matrix is a matrix which starts from 1, and increments one by one in the sequence direction. In this way, the similarity calculation processing ends.

[Detection of Deviation or the Like Between Images]

Note that the paths upon executing DP matching in steps S1704 and S1710 can be calculated. More specifically, upon calculating the penalty g(i, j) at the intersection (i, J) in FIG. 14 and recurrence equation (1), which of penalties g(i−1, j), g(i−1, j−1), and g(i, j−1) is used is stored, and a path is traced after determination of the final solution, thus obtaining the path A in FIG. 13.

Based on the path upon executing DP matching in step S1704, a deviation in the right-and-left direction and enlargement/reduction between the query and test images can be detected. For example, as a result of calculating the path upon executing DP matching in step S1704, if a path shown in FIG. 18A is obtained, almost no deviation in the right-and-left direction is likely to be detected between the query and test images.

Figure 18A:
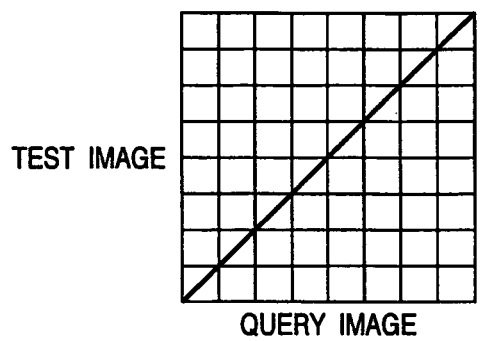
FIGS. 18A to 18G are views for explaining path examples of two-dimensional DP matching.
Figure 18B:
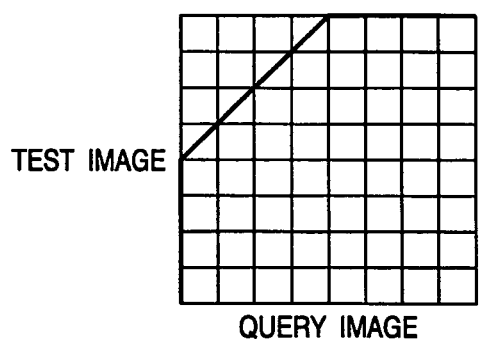
Figure 18C:
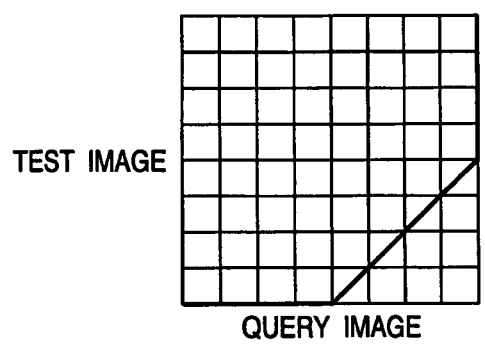

When the slope of a path is nearly the same as that in FIG. 18A, but the path deviates in the upper left direction, as shown in FIG. 18B, the test image is likely to deviate rightward with respect to the query image. Conversely, in case of a path shown in FIG. 18C, the test image is likely to deviate in the left direction with respect to the query image.

Figure 18D:
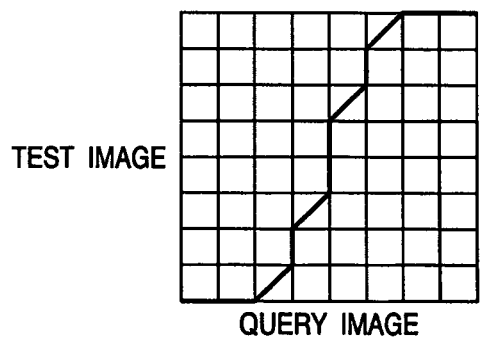
Figure 18E:
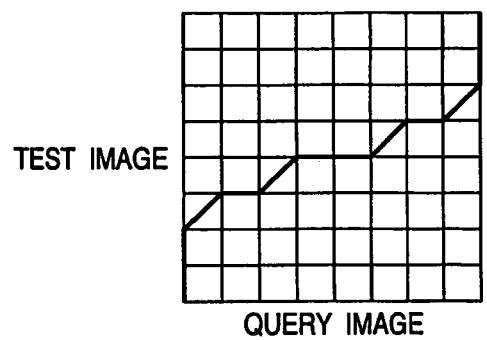

When the slope becomes steep, as shown in FIG. 18D, the test image is likely to be enlarged in the right-and-left direction with respect to the query image. Conversely, when the slope becomes moderate, as shown in FIG. 18E, the test image is likely to be reduced in the right-and-left direction with respect to the query image.

Figure 18F:
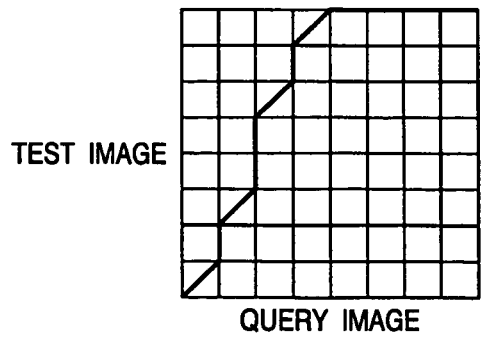
Figure 18G:
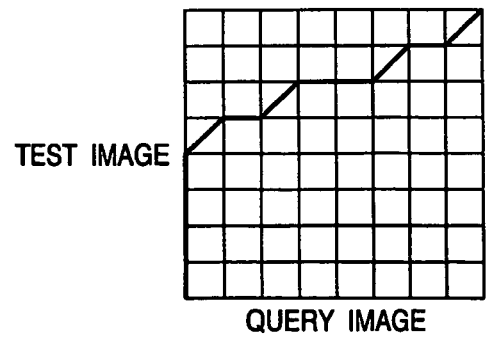

When these paths are combined, i.e., when the slope becomes steep and the path deviates leftward, as shown in FIG. 18F, the test image is likely to be formed by enlarging the left side of the query image. When the slope becomes moderate and deviates upward, as shown in FIG. 18G, the query image is likely to be reduced to the right side of the test image.

A unit result in step S1704 is a feature for each line, and the tendencies of a plurality of lines are combined to detect the slope of the test image with respect to the query image. For example, when the path of the first line is as shown in FIG. 18A, and the path changes, as shown in FIG. 18B, while the lines shift downward like the second line and third line, the test image is likely to be aslope to the obliquely left with respect to the query image.

Based on the path upon executing DP matching in step S1710, a deviation in the up-and-down direction and enlargement/reduction between the query and test images can be detected. For example, as a result of calculating the path upon executing DP matching in step S1710, if the path shown in FIG. 18A is obtained, almost no deviation in the up-and-down direction is likely to be detected between the query and test images.

When the slope of the path is nearly the same as that in FIG. 18A, but the path deviates in the upper left direction, as shown in FIG. 18B, the test image is likely to deviate downward with respect to the query image. Conversely, in case of the path shown in FIG. 18C, the test image is likely to deviate upward with respect to the query image.

When the slope becomes steep, as shown in FIG. 18D, the test image is likely to be enlarged in the up-and-down direction with respect to the query image. Conversely, when the slope becomes moderate, as shown in FIG. 18E, the test image is likely to be reduced in the up-and-down direction with respect to the query image.

When these paths are combined, i.e., when the slope becomes steep and the path deviates leftward, as shown in FIG. 18F, the test image is likely to be formed by enlarging the upper side of the query image. When the slope becomes moderate and deviates upward, as shown in FIG. 18G, the query image is likely to be reduced to the lower side of the test image.

Furthermore, by combining the results of the plurality of lines in step S1704 and the results in step S1710, a feature between image data of the test and query images can be detected.

As described above, when DP matching is done in the horizontal and vertical directions, i.e., two-dimensionally, even when the image angle has changed in the horizontal or vertical direction, and further in the oblique direction or when an object has moved, image retrieval can be conducted. Also, due to the time warping characteristics of DP matching, a zoom-up sensed image or macro sensed image can be retrieved.

In this embodiment, a similar line matrix is obtained using label sequences corresponding to horizontal block lines.

Also, a similar line matrix can be obtained using label sequences corresponding to vertical block lines by the same method as described above.

In this embodiment, similar image retrieval is conducted by expressing image feature amounts as labels. Also, a method of conducting similar image retrieval without converting image feature amounts into labels can be easily imagined from the above method.

As can be seen from the above description, in the image processing apparatus according to this embodiment, an image feature amount group (a group of image feature amounts obtained by dividing the feature amount space) is expressed by one symbol (i.e., one label), and the distance between label sequences is calculated by the aforementioned DP matching and penalty matrix. In this way, the computation volume upon calculating the distance between blocks of two images can be greatly reduced, and similar image feature amounts are expressed by the same label. Hence, similar image retrieval can be conducted favorably.

Since (1) the concept of the distance between label sequences based on the line penalty matrix is introduced and (2) the 2D DP matching that implements comparison between label matrices which can minimize the total distance (to maximize the similarity) after the label positions to be compared are ambiguously moved back and forth, even when the image angle has changed slightly, similar image retrieval can be conducted, and images with similar atmospheres can be retrieved.

Furthermore, since the image processing apparatus according to this embodiment uses an index database (label matrix index), similar image retrieval can be further speeded up.

That is, according to the image processing apparatus of this embodiment, retrieval processing of similar images can be executed at high speed in consideration of layouts of image feature amounts, and that of similar images can be executed while absorbing differences due to variations of the photographing condition (for images which are hard to undergo similar image retrieval such as an image whose angle has changed, an image in which the object position has changed, an image in which another photographing condition has changed, and so forth, certain differences of image feature amounts are absorbed, thus allowing robust similar image retrieval.

Second Embodiment

The first embodiment has been explained under the assumption that natural images are to be retrieved. However, the present invention is not limited to natural images, and can be applied to retrieve processing of artificial images such as CG, CAD, and the like.

In the first embodiment, the color information is selected as image feature amounts. However, the present invention is not limited to such specific image feature amounts, and can be practiced by obtaining other image feature amounts for respective divided image blocks.

In the first embodiment, similar image retrieval is conducted using one type of image feature amounts. However, the present invention is not limited to such specific processing. By making logical operations with retrieval results obtained by similar image retrieval using other types of image feature amounts, high-speed similar image retrieval based on a plurality of types of image feature amounts can be implemented.

When similar image retrieval is conducted using a plurality of types of image feature amounts for a single image, a similarity obtained by the first embodiment may be considered as one new image feature amount to execute multivariate analysis using a plurality of parameters, and similar image retrieval may be conducted using a statistical distance measure. In the first embodiment, similar images whose similarities exceed a predetermined value are output as retrieval results. However, a predetermined number of images in turn from those with higher similarities may be output as retrieval results.

Figure 19:
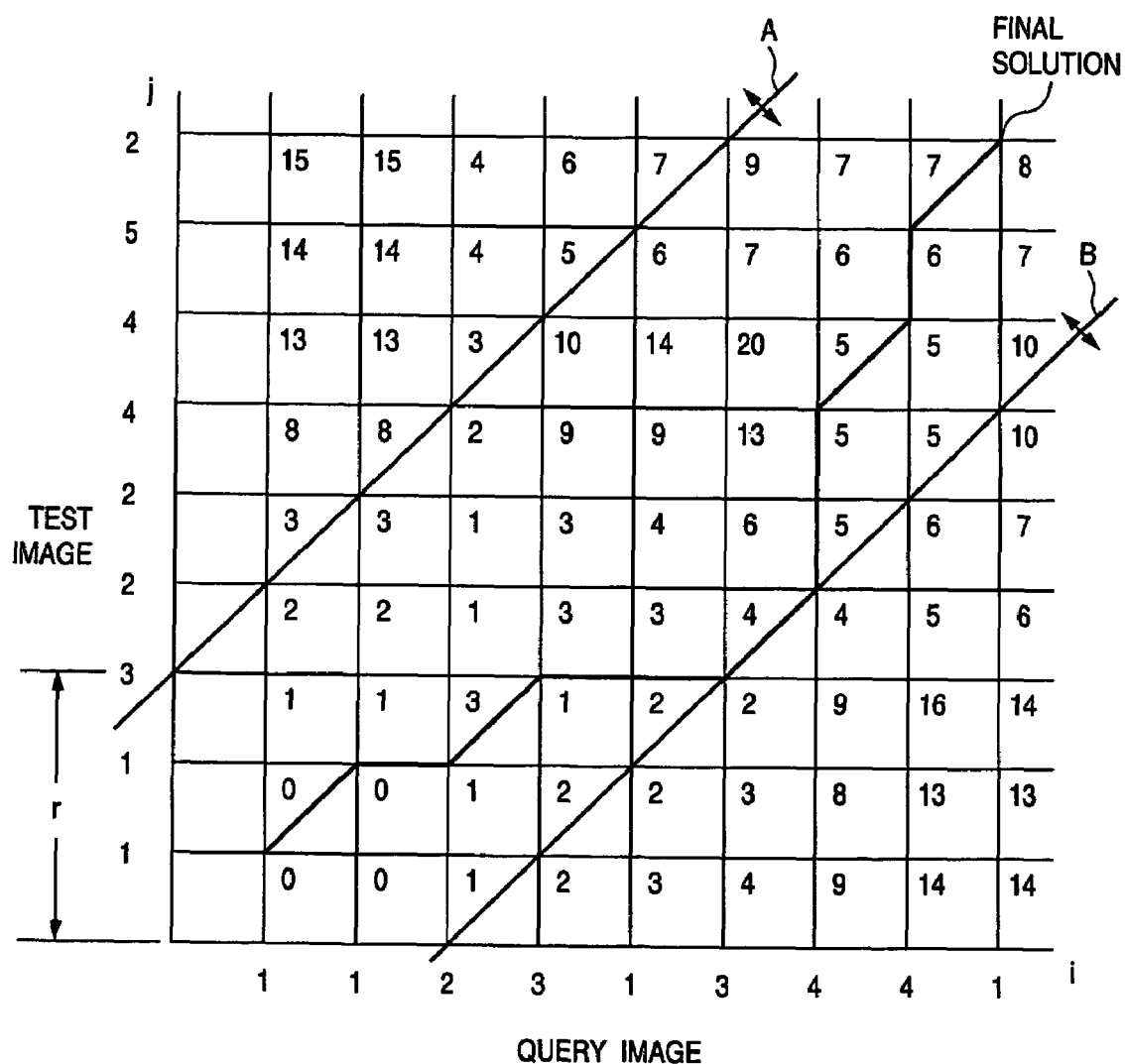
FIG. 19 is a view for explaining adjustment of a matching window in DP matching.

Furthermore, by changing the width of the so-called matching window in DP matching by designating an ambiguity, the ambiguity of retrieval may be desirably set. FIG. 19 is a view for explaining the matching window in DP matching. In FIG. 19, a straight line A is expressed by $J=I+r$, and a straight line B is expressed by $J=I-r$. The width of the matching window can be changed by changing the value r. Therefore, when this value r is configured to be changed by designating an ambiguity from the keyboard 104, similarity retrieval can be conducted with a desired ambiguity (width of the matching window) of the user.

In 2D DP matching as in the first embodiment, the width of the matching window in horizontal DP matching and that of the matching window in vertical DP matching may be independently set. Alternatively, the two matching windows may be configured to change at different change ratios. In this way, the user can flexibly set an ambiguity for similar image retrieval. For example, when the block order in one of FIGS. 9A to 9E is used, if the user wants to allow horizontal movement of an object of interest in the query image or if the query image is a horizontally elongated image, he or she can increase the width of the matching window in horizontal DP matching so as to increase the ambiguity in the horizontal direction.

Third Embodiment

In the first and second embodiments, 2D DP matching is adopted upon calculation of a similarity. However, the present invention is not limited to this, and a similarity may be calculated by selecting a minimum distance from a plurality of paths based on deformation prediction. This embodiment will be described in detail hereinafter.

[Image Retrieval Processing]

Flow of Similarity Calculation

Figure 20:
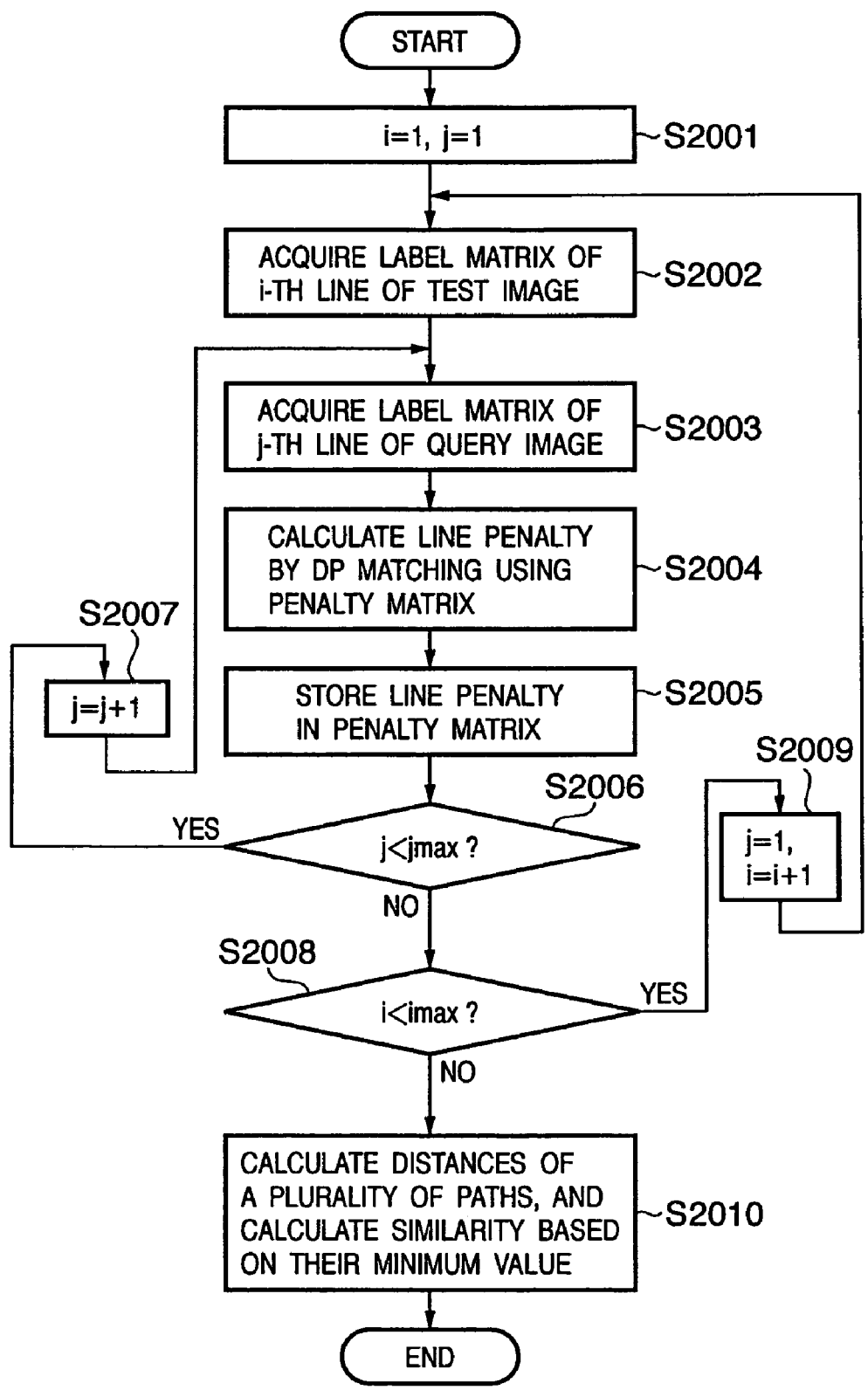
FIG. 20 is a flowchart for explaining the sequence of similarity calculation.

FIG. 20 is a flowchart for explaining the sequence of similarity calculation in the image processing apparatus according to this embodiment. The similarity calculation processing will be described below using the flowchart of FIG. 20 with reference to FIGS. 15A to 15C and FIG. 16.

In step S2001, a variable i indicating the line number of the test image and a variable j indicating that of the query image are initialized to 1 both to indicate the first line. In step S2002, a label sequence in the i-th line of the test image is acquired. For example, in case of FIG. 15B, if i=1, a sequence "abcde" is acquired. In step S2003, a label sequence in the j-th line of the query image acquired. For example, in FIG. 15A, if j=1, a sequence "ABCDE" is acquired.

In step S2004, the distance (line penalty) between the two label sequences obtained in steps S2002 and S2003 is calculated by DP matching using the color cell penalty matrix described using FIG. 11. In step S2005, the line penalty obtained in step S2004 is stored in a line penalty matrix.

The processes in steps S2003 to S2005 are applied to all the lines of the query image (steps S2006 and S2007). Furthermore, the processes in steps S2003 to S2007 are applied to all the lines of the test image (steps S2008 and S2009). In this manner, the distances between the label lines of the query and test images are stored as line penalties in the line penalty matrix.

In step S2010, similarities in a plurality of paths based on deformation prediction are calculated, and their minimum value is output. Note that the plurality of paths based on deformation prediction are predetermined straight lines (see straight lines in FIGS. 21A to 21G), and the similarity in each path is an average value calculated by adding line penalties (see halftone portions in FIGS. 21A to 21G) located near each straight line.

[Detection of Deviation or the Like Between Images]

Note that the path upon executing DP matching in step S2004 can be calculated as in the first embodiment. More specifically, upon calculating the penalty g(i, j) at the intersection (i, j) in FIG. 14 and recurrence equation (1), which of penalties g(i−1, j), g(i−1, j−1), and g(i, j−1) is used is stored, and a path is traced after determination of the final solution, thus obtaining the path A in FIG. 13.

Based on the path upon executing DP matching in step S2004, a deviation in the right-and-left direction and enlargement/reduction between the query and test images can be detected. For example, as a result of calculating the path upon executing DP matching in step S2004, if a path shown in FIG. 18A is obtained, almost no deviation in the right-and-left direction is likely to be detected between the query and test images.

When the slope of a path is nearly the same as that in FIG. 18A, but the path deviates in the upper left direction, as shown in FIG. 18B, the test image is likely to deviate rightward with respect to the query image. Conversely, in case of a path shown in FIG. 18C, the test image is likely to deviate in the left direction with respect to the query image.

When the slope becomes steep, as shown in FIG. 18D, the test image is likely to be enlarged in the right-and-left direction with respect to the query image. Conversely, when the slope becomes moderate, as shown in FIG. 18E, the test image is likely to be reduced in the right-and-left direction with respect to the query image.

When these paths are combined, i.e., when the slope becomes steep and the path deviates leftward, as shown in FIG. 18F, the test image is likely to be formed by enlarging the left side of the query image. When the slope becomes moderate and deviates upward, as shown in FIG. 18G, the query image is likely to be reduced to the right side of the test image.

A unit result in step S2004 is a feature for each line, and the tendencies of a plurality of lines are combined to detect the slope of the test image with respect to the query image. For example, when the path of the first line is as shown in FIG. 18A, and the path changes, as shown in FIG. 18B, while the lines shift downward like the second line and third line, the test image is likely to be aslope to the obliquely left with respect to the query image.

Based on the path upon executing DP matching in step S2010, a deviation in the up-and-down direction and enlargement/reduction between the query and test images can be detected. For example, as a result of calculating the path upon executing DP matching in step S2010, if the path shown in FIG. 21A is obtained, almost no deviation in the up-and-down direction is likely to be detected between the query and test images.

Figure 21A:
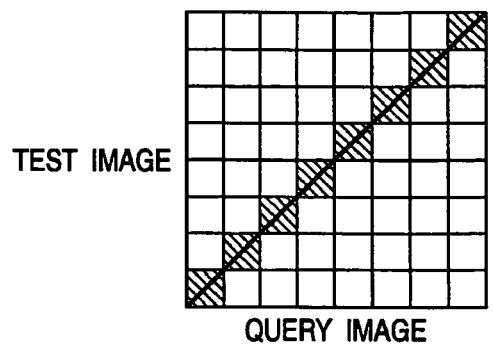
FIGS. 21A to 21G are views for explaining a plurality of path examples based on deformation prediction.
Figure 21B:
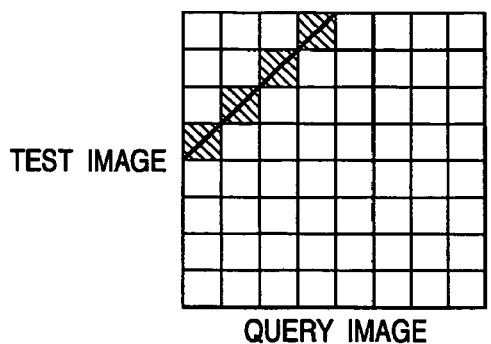
Figure 21C:
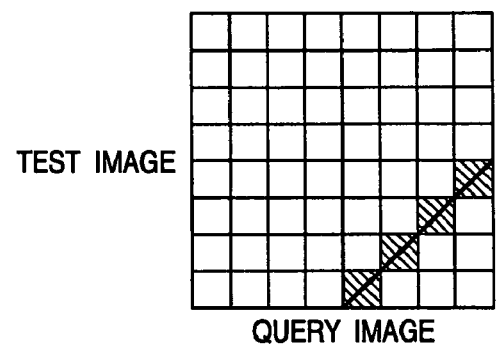

When the slope of the path is nearly the same as that in FIG. 21A, but the path deviates in the upper left direction, as shown in FIG. 21B, the test image is likely to deviate downward with respect to the query image. Conversely, in case of the path shown in FIG. 21C, the test image is likely to deviate upward with respect to the query image.

Figure 21D:
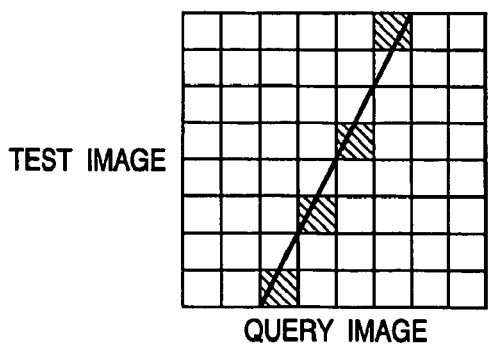
Figure 21E:
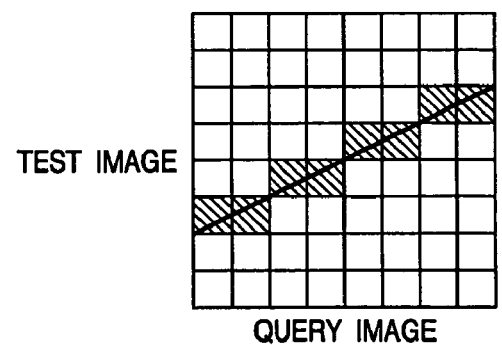

When the slope becomes steep, as shown in FIG. 21D, the test image is likely to be enlarged in the up-and-down direction with respect to the query image. Conversely, when the slope becomes moderate, as shown in FIG. 21E, the test image is likely to be reduced in the up-and-down direction with respect to the query image.

Figure 21F:
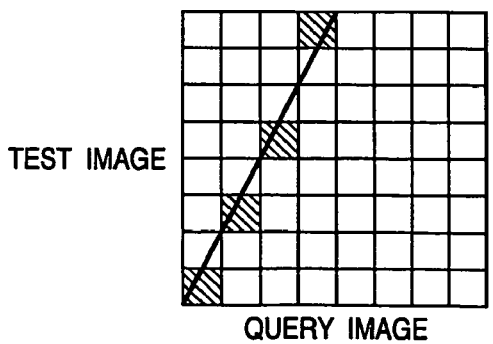
Figure 21G:
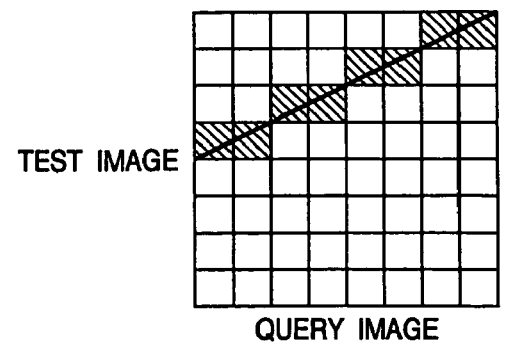

When these paths are combined, i.e., when the slope becomes steep and the path deviates leftward, as shown in FIG. 21F, the test image is likely to be formed by enlarging the upper side of the query image. When the slope becomes moderate and deviates upward, as shown in FIG. 21G, the query image is likely to be reduced to the lower side of the test image.

Furthermore, by combining the results of the plurality of lines in step S2004 and the results in step S2010, a feature between image data of the test and query images can be detected.

As described above, when DP matching is done in the horizontal direction and matching that assumes paths based on deformation prediction is done in the vertical direction, i.e., when matching is done two-dimensionally, even when the image angle has changed in the horizontal or vertical direction, and further in the oblique direction or when an object has moved, image retrieval can be conducted. Also, due to the time warping characteristics of DP matching or matching that assumes paths based on deformation prediction, a zoom-up sensed image or macro sensed image can be retrieved.

In this embodiment, a similar line matrix is obtained using label sequences corresponding to horizontal block lines. Also, a similar line matrix can be obtained using label sequences corresponding to vertical block lines by the same method as described above.

In this embodiment, similar image retrieval is conducted by expressing image feature amounts as labels. Also, a method of conducting similar image retrieval without converting image feature amounts into labels can be easily imagined from the above method.

As described above, in the image processing apparatus according to this embodiment, an image feature amount group (a group of image feature amounts obtained by dividing the feature amount space) is expressed by one symbol (i.e., one label), and the distance between label sequences Is calculated by the aforementioned DP matching and penalty matrix. In this way, the computation volume upon calculating the distance between blocks of two images can be greatly reduced, and similar image feature amounts are expressed by the same label. Hence, similar image retrieval can be conducted favorably.

Furthermore, since (1) the concept of the distance between label sequences based on the line penalty matrix is introduced and (2) the 2D DP matching that implements comparison between label matrices which can minimize the total distance (to maximize the similarity) after the label positions to be compared are ambiguously moved back and forth, even when the image angle has changed slightly, similar image retrieval can be conducted, and images with similar atmospheres can be retrieved.

Moreover, since the image processing apparatus according to this embodiment uses an index database (label matrix index), similar image retrieval can be further speeded up.

That is, according to the image processing apparatus of this embodiment, retrieval processing of similar images can be executed at high speed in consideration of layouts of image feature amounts, and that of similar images can be executed while absorbing differences due to variations of the photographing condition (for images which are hard to undergo similar image retrieval such as an image whose angle has changed, an image in which the object position has changed, an image in which another photographing condition has changed, and so forth, certain differences of image feature amounts are absorbed, thus allowing robust similar image retrieval).

Fourth Embodiment

The third embodiment has been explained under the assumption that natural images are to be retrieved. However, the present invention is not limited to natural images, and can be applied to retrieve processing of artificial images such as CG, CAD, and the like.

In the first embodiment, the color information is selected as image feature amounts. However, the present invention is not limited to such specific image feature amounts, and can be practiced by obtaining other image feature amounts for respective divided image blocks.

In the third embodiment, similar image retrieval is conducted using one type of image feature amounts. However, the present invention is not limited to such specific processing. By making logical operations with retrieval results obtained by similar image retrieval using other types of image feature amounts, high-speed similar image retrieval based on a plurality of types of image feature amounts can be implemented.

When similar image retrieval is conducted using a plurality of types of image feature amounts for a single image, a similarity obtained by the third embodiment may be considered as one new image feature amount to execute multivariate analysis using a plurality of parameters, and similar image retrieval may be conducted using a statistical distance measure. In the third embodiment, similar images whose similarities exceed a predetermined value are output as retrieval results. However, a predetermined number of images in turn from those with higher similarities may be output as retrieval results.

Furthermore, by changing the width of the so-called matching window in DP matching by designating an ambiguity, the ambiguity of retrieval may be desirably set. FIG. 19 is a view for explaining the matching window in DP matching. In FIG. 19, a straight line A is expressed by J=I+r, and a straight line B is expressed by J=I−r. The width of the matching window can be changed by changing the value r. Therefore, when this value r is configured to be changed by designating an ambiguity from the keyboard 104, similarity retrieval can be conducted with a desired ambiguity (width of the matching window) of the user.

Figure 22:
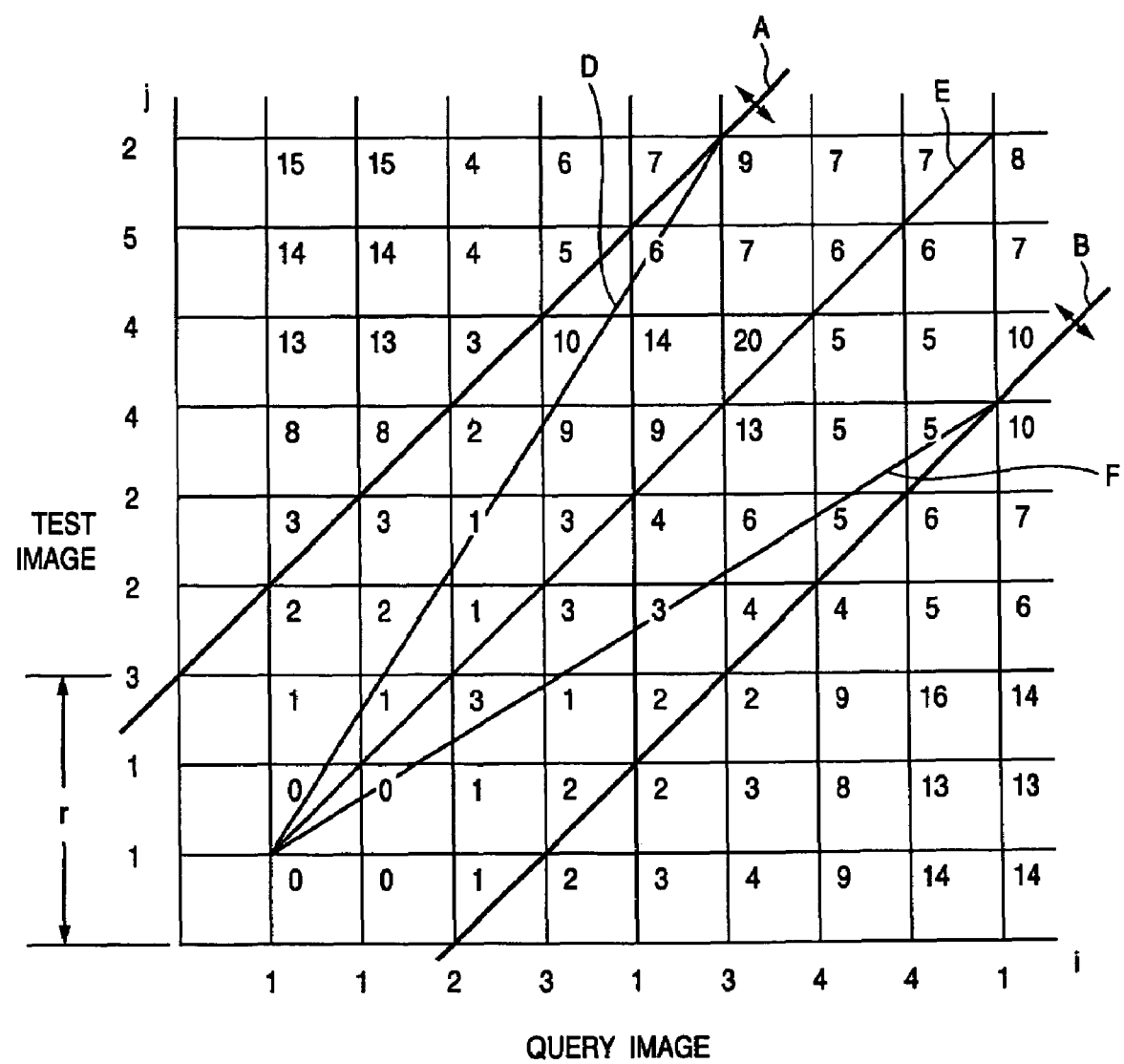
FIG. 22 is a view for explaining the width of path generation based on deformation prediction.

Likewise, by changing the width of path generation based on deformation prediction, the ambiguity of retrieval can be desirably set. FIG. 22 is a view for explaining the width of path generation. In FIG. 22, a straight line A is expressed by J=I+r, and a straight line B is expressed by J=I−r. The width of path generation can be changed by changing the value r. Like straight lines C, D, and E in FIG. 22, paths are generated based on deformation prediction between the straight lines A and B. Therefore, when this value r is configured to be changed by designating an ambiguity from the keyboard 104, similarity retrieval can be conducted with a desired ambiguity (width of path generation) of the user.

In similar image retrieval of the third embodiment, the width of the matching window in horizontal DP matching and that of path generation in matching in the vertical direction that assumes paths based on deformation prediction may be independently set. Alternatively, the two matching windows may be configured to change at different change ratios. In this way, the user can flexibly set an ambiguity for similar image retrieval. For example, when the block order in one of FIGS. 9A to 9E is used, if the user wants to allow horizontal movement of an object of interest in the query image or if the query image is a horizontally elongated image, he or she can increase the width of generation in horizontal matching so as to increase the ambiguity in the horizontal direction.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-337947 filed on Nov. 22, 2004, which is hereby incorporated by reference herein.

What is claimed is:

1. An image processing apparatus for calculating a similarity between image data, comprising:
  a first generation unit configured to generate a feature amount matrix by dividing image data into a plurality of blocks, and by extracting image feature amounts of the image data acquired for the respective blocks;
  a second generation unit configured to execute Dynamic Programming ("DP") matching between each line of a first feature amount matrix of first image data, and each line of a second feature amount matrix of second image data, and generate a line penalty matrix based on results of the DP matching, by setting each result of the DP matching as a line penalty in the line penalty matrix, wherein the first feature amount matrix and the second feature amount matrix are generated by said first generation unit; and a matching unit configured to calculate a similarity between the first image data and the second image data based on the line penalty matrix generated by said second generation unit.

2. The apparatus according to claim 1, wherein the matching unit calculates a minimum sum of penalties of the line penalty matrix, as the similarity between the first and second image data, and wherein the minimum sum is calculated by adding penalties from the predetermined corner of the line penalty matrix to the opposite corner of the line penalty matrix.

3. The apparatus according to claim 1, further comprising an output unit configured to output, when the calculated similarity exceeds a predetermined value, the second image data as a retrieval result.

4. An image processing method for calculating a similarity between image data, comprising:

a first generation step of using an image processing apparatus to generate a feature amount matrix by dividing image data into a plurality of blocks, and by extracting image feature amounts of the image data acquired for the respective blocks;

a second generation step of executing Dynamic Programming ("DP") matching between each line of a first feature amount matrix of first image data, and each line of a second feature amount matrix of second image data, and generating a line penalty matrix based on results of the DP matching, by setting each result of the DP matching as a line penalty in the line penalty matrix, and wherein the first feature amount matrix and the second feature amount matrix are generated by said first generation unit; and a matching step of calculating a similarity between the first image data and the second image data based on the line penalty matrix generated in the second generation step.

5. The image processing method according to claim 4, wherein a minimum sum of penalties of the line penalty matrix is calculated in said matching step, as the similarity between the first and second image data, and wherein the minimum sum is calculated by adding penalties from a predetermined corner of the line penalty matrix to the opposite corner of the line penalty matrix.

6. A computer-readable storage medium storing a computer-executable control program, said computer-executable control program being executable by a computer so as to control the computer to execute an image processing method for calculating a similarity between image data, said image processing method comprising:

a first generation step of generating a feature amount matrix by dividing image data into a plurality of blocks, and by extracting image feature amounts of the image data acquired for the respective blocks;

a second generation step of executing Dynamic Programming ("DP") matching between each line of a first feature amount matrix of first image data, and each line of a second feature amount matrix of second image data, and generating a line penalty matrix based on results of the DP matching. by setting each result of the DP matching as a line penalty in the line penalty matrix, and wherein the first feature amount matrix and the second feature amount matrix are generated by said first generation unit; and a matching step of calculating a similarity between the first image data and the second image data based on the line penalty matrix generated in the second generation step.

7. The apparatus according to claim 1, wherein the first generation unit converts each of the image feature amounts extracted from each block to corresponding labels, and the second generation unit executes DP matching by using a predetermined penalty matrix.

* * * * *